United States Patent [19]

Axelson, Jr. et al.

[11] Patent Number: 4,527,245
[45] Date of Patent: Jul. 2, 1985

[54] COMMODITY HANDLING SYSTEM

[75] Inventors: John A. Axelson, Jr., Bismarck; Kenneth M. Wise, Mandan, both of N. Dak.

[73] Assignee: JBC Systems, Inc., Bismarck, N. Dak.

[21] Appl. No.: 386,239

[22] Filed: Jun. 8, 1982

[51] Int. Cl.³ .............................................. G06F 15/46
[52] U.S. Cl. .................................... 364/478; 222/52; 364/479; 364/502
[58] Field of Search ............... 364/478, 479, 466, 567, 364/509, 510, 502; 222/20, 25, 26, 28, 52, 55, 63, 71, 132, 134, 145, 129, 129.3, 129.4, 136, 137; 366/152, 160, 162,

[56] References Cited
U.S. PATENT DOCUMENTS

| 3,908,862 | 9/1975 | Chandra et al. | 222/134 X |
| 3,934,756 | 1/1976 | Young et al. | 222/134 X |
| 4,209,258 | 6/1980 | Oakes | 366/152 X |
| 4,275,822 | 6/1981 | Juffa et al. | 364/479 X |
| 4,353,482 | 10/1982 | Tomlinson et al. | 364/479 X |
| 4,416,394 | 11/1983 | Gelfand et al. | 222/132 X |

OTHER PUBLICATIONS

Heide—"Silo Automation"—Siemens Review XLIV (1977), No. 11, vol. 44, pp. 9-13.

Primary Examiner—Joseph F. Ruggiero
Attorney, Agent, or Firm—Merchant, Gould, Smith, Edell, Welter & Schmidt

[57] ABSTRACT

An apparatus for blending commodities in a commodity handling system which includes containers (46) for holding the various commodities, the containers (46) having discharge means for enabling commodities to be discharged from the containers, and conveying means (43) for moving the commodities from one location to another is disclosed. The blending apparatus includes means for selecting the containers (46) whose commodities are to be blended together. The selection means also includes means for selecting the relative percentages of the commodities to be blended. In addition, there is means for determining the corresponding amount of opening for the discharge means such that the required blending percentages are obtained. Additionally, there is control means for opening the discharge means the required amount to achieve the selected blending percentages. The control means includes a master cylinder means (42) interconnected to a plurality of slave cylinders (44), slave cylinders (44) being operatively interconnected to the discharge means.

19 Claims, 26 Drawing Figures

Microfiche Appendix Included
(2 Microfiche, 130 Pages)

FIG. 5E
- ☐ +24V DC DISTRIBUTION TERMINAL
- ⌷ BOTTOM OF MODICON
- ◇ J-BOX IN HYDRAULIC PANEL
- ▽ A S I SENSOR TERMINAL
- ▭ MODICON T/O TERMINAL
- ○ RELAY SOCKET TERMINAL
- ⬡ BOTTOM OF MANUAL PANEL
FIG. 2A
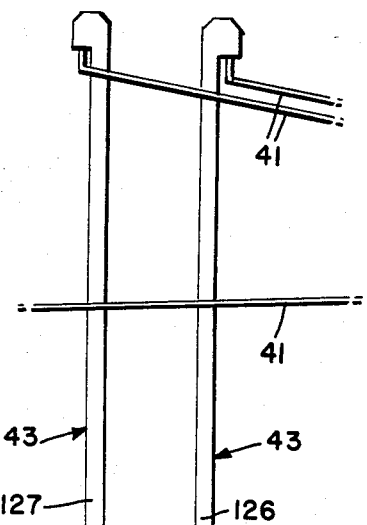
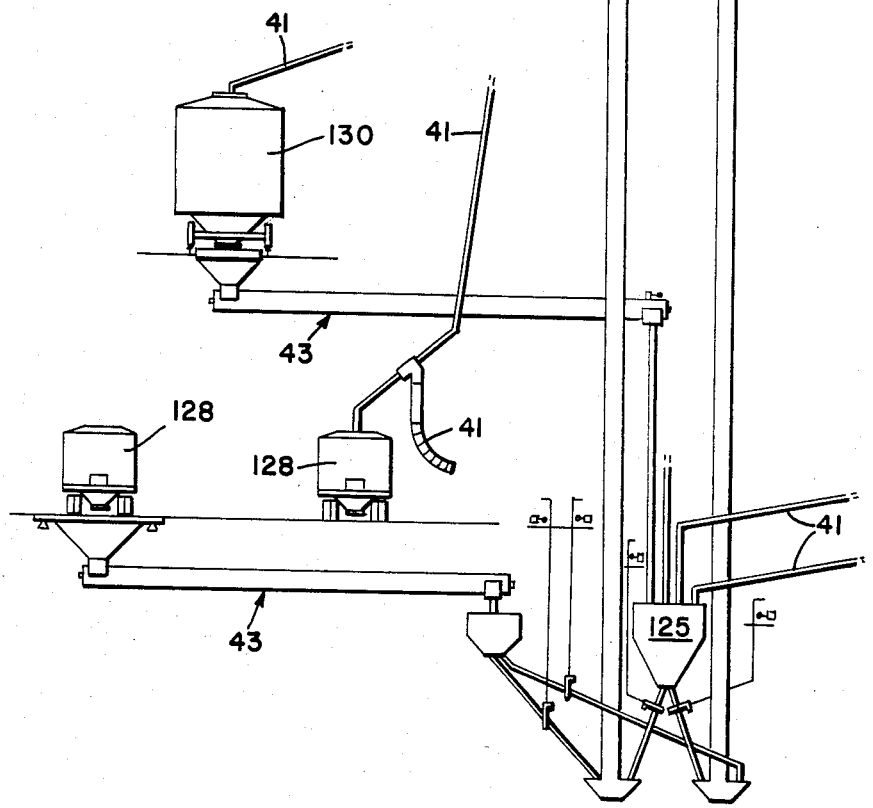

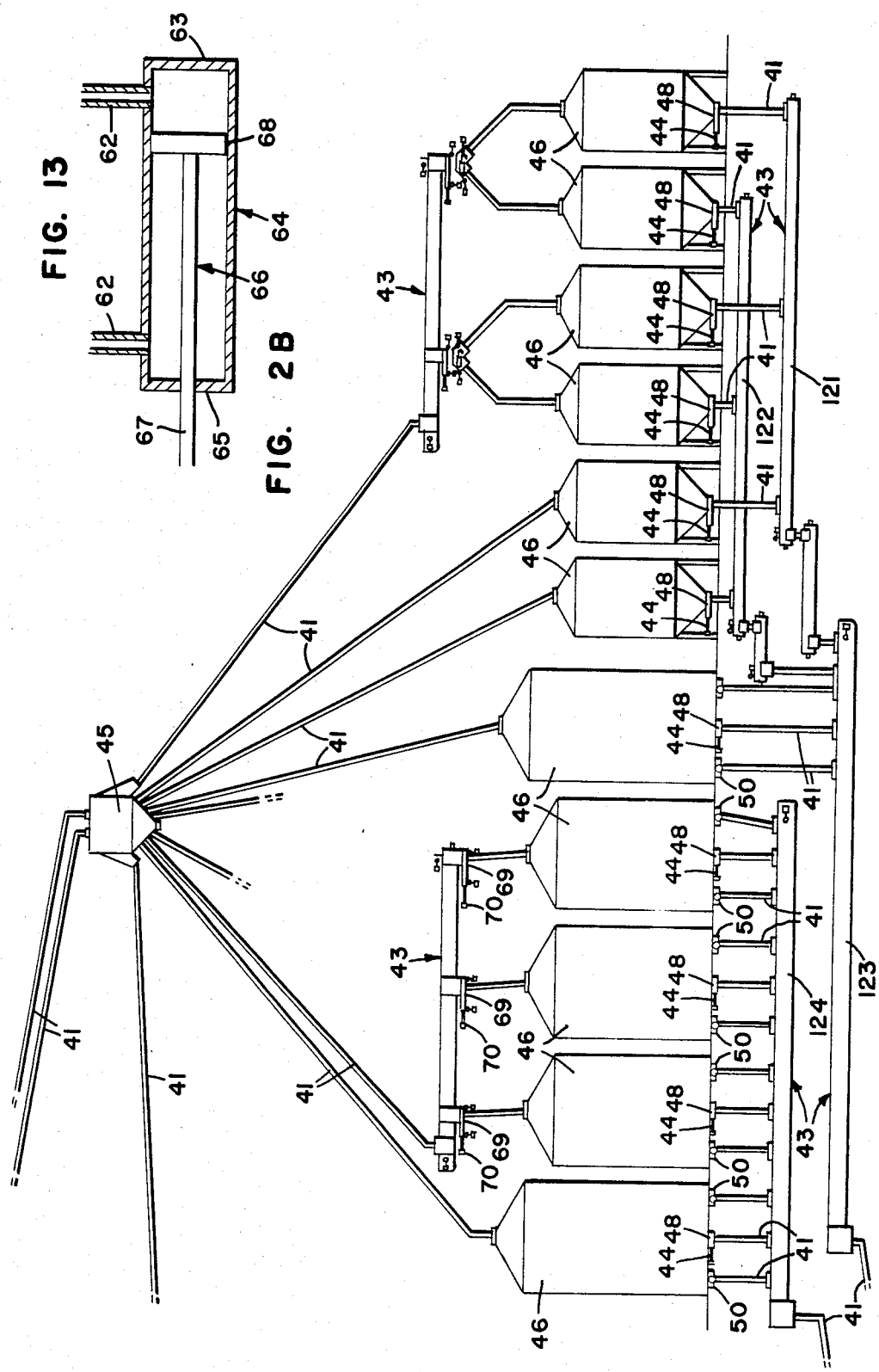

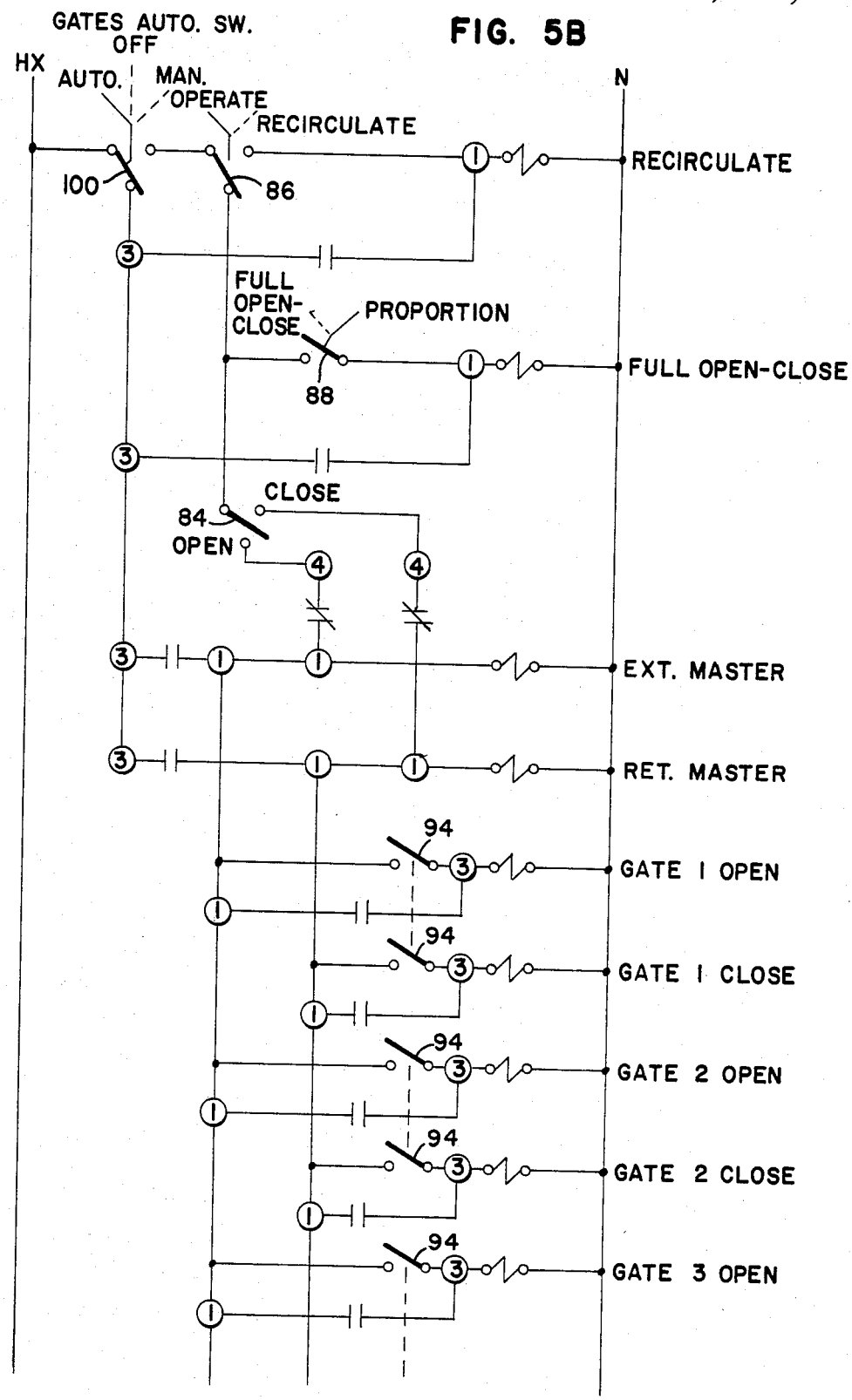

FIG. 7

```
GRAIN ELEVATOR
MANAGEMENT SYSTEM

MAIN MENU

1 . . MAINTENANCE CHART
  2 . . BIN CHART
  3 . . GRAIN CHART
  4 . . MASTER STATUS
  5 . . FREE LEGS
  6 . . STATUS
  7 . . SHIPPING
  8 . . ASSIGN GATES
  9 . . RECEIVING
```

FIG. 6

```
    GRAIN ELEVATOR
   MANAGEMENT SYSTEM

ASSIGN GATES

LEG:           REQUESTED  BPH:

FROM GATE:      __        __      __

GATE %   :      __        __      __

GRAIN TYPE:  __      TO BIN:   __

ALT BIN:  __

OK TO PROCEED ?   Y / N :
```

COMMODITY HANDLING SYSTEM

MICROFICHE APPENDIX CROSS-REFERENCE

This application includes a Microfiche Appendix of two fiche and a total of 130 frames.

TECHNICAL FIELD OF THE INVENTION

The present invention relates to a commodity handling system. In particular, the present invention relates to a system for selecting commodities from a plurality of containers for delivery to a common destination, the selection being based on a percentage of blend or a relative proportion of each commodity.

BACKGROUND OF THE INVENTION

Commodity handling systems such as grain elevator systems for conveying commodities from one location to another are old in the art. Frequently, commodity or grain blending is performed wherein different types of grains from a plurality of grain bins are conveyed to a common destination to create a blend or mixture of commodities. For example, a blend of 30% corn, 50% wheat, and 20% oats might be required at a certain destination such as a train car. Currently, whenever grain blending is performed, the discharge gates of the various grain bins are opened based on the percentage of the gate opening and not as a percentage of the total flow rate, or blend.

Unfortunately, the percentage of gate opening is frequently not the same as the percentage of blend, as many factors affect the flow of grains through a gate. The same sized gates set to the same percentage of openings will not necessarily provide the same rate of grain flow therethrough as the flow is subject to such factors as bin structure, gate structure, angle/size of the discharge spouting, etc. Therefore, blending of grains according to the percentage of gate openings frequently does not derive the required blending percentages.

Additionally, automated grain handling systems which allow grain blending based on a percentage of gate openings do not have manual backup support to enable manual control of the blending process in the event of computer failure.

Furthermore, the sensors utilized to monitor gate opening during the grain blending process are frequently inaccurate and not reliable.

The present invention solves these and many other problems associated with the prior art.

SUMMARY OF THE INVENTION

The present invention relates to an apparatus for blending commodities in a commodity handling system which includes containers for holding the various commodities, the containers having discharge means for enabling commodities to be discharged from the containers, and conveying means for moving the commodities from one location to another. The blending apparatus includes means for selecting the containers whose commodities are to be blended together. The selection means also includes means for selecting the relative percentages of the commodities to be blended. In addition, there is means for determining the corresponding amount of opening for the discharge means such that the required blending percentages are obtained. Additionally, there is control means for opening the discharge means the required amount to achieve the selected blending percentages. The control means includes a master cylinder means interconnected to a plurality of slave cylinders, the slave cylinders being operatively interconnected to the discharge means.

A particularly advantageous feature of the present invention is that commodity blending is based on the blend percentages requested by an operator and not on the percentage of individual gate opening. Consequently, very efficient and accurate blending of grain is achieved.

Furthermore, in one embodiment of the present invention, checks are made on the load capacities of the various conveying devices and gates to make sure that there is no overloading of the various equipment which might result in damaged parts or loss of grain.

Additionally, the present invention utilizes a single master actuator apparatus which is monitored by a sensor. The master actuator is located at a common location along with its sensor thus eliminating the need for a plurality of sensors distributed throughout the system by the various gates and conveying devices. Because of the central location of the master cylinder, a centrally located control area is possible thereby minimizing the length of control and actuator lines between various components of the system.

Additionally, in one embodiment of the present invention a master hydraulic cylinder is utilized, thus the positioning of electrical components, such as sensors and actuators at remote locations, are done away with thereby reducing the chances of fire often associated with such electrical components. Furthermore, the present invention is much less expensive than various types of electrical control systems.

Convenience of operation is another advantageous feature as the operator control area may be located at one location, which may be anywhere throughout the system. Furthermore, in one embodiment to the present invention, the operator is provided with both automatic and manual control, thereby enabling control even if the computer should fail.

In yet another embodiment of the present invention, a digital shaft encoder is utilized as the sensor for the master hydraulic cylinder movement. This results is a high degree of accuracy and reliability. Furthermore, a potentiometer is utilized to provide an analog readout to a manual control panel, thereby enabling an operator to monitor movement of the master cylinder, even should the computer fail.

These and various other advantages and features of novelty which characterized the invention are pointed out with particularity in the claims annexed to and forming a part hereof. However, for a better understanding of the invention, its advantages and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views.

FIGS. 2A and 2B are a diagrammatic representation of a sample commodity handling system;

FIGS. 5A–5E are an electrical schematic and associated legend of the gate opening apparatus;

FIG. 6 is a display format for selection of gate blending percentages;

FIG. 7 is a display menu for a grain elevator management system;

FIG. 13 is a diagrammatic view of a hydraulic apparatus of the present invention.

DETAILED DESCRIPTION OF THE INVENTION

Figure 1:
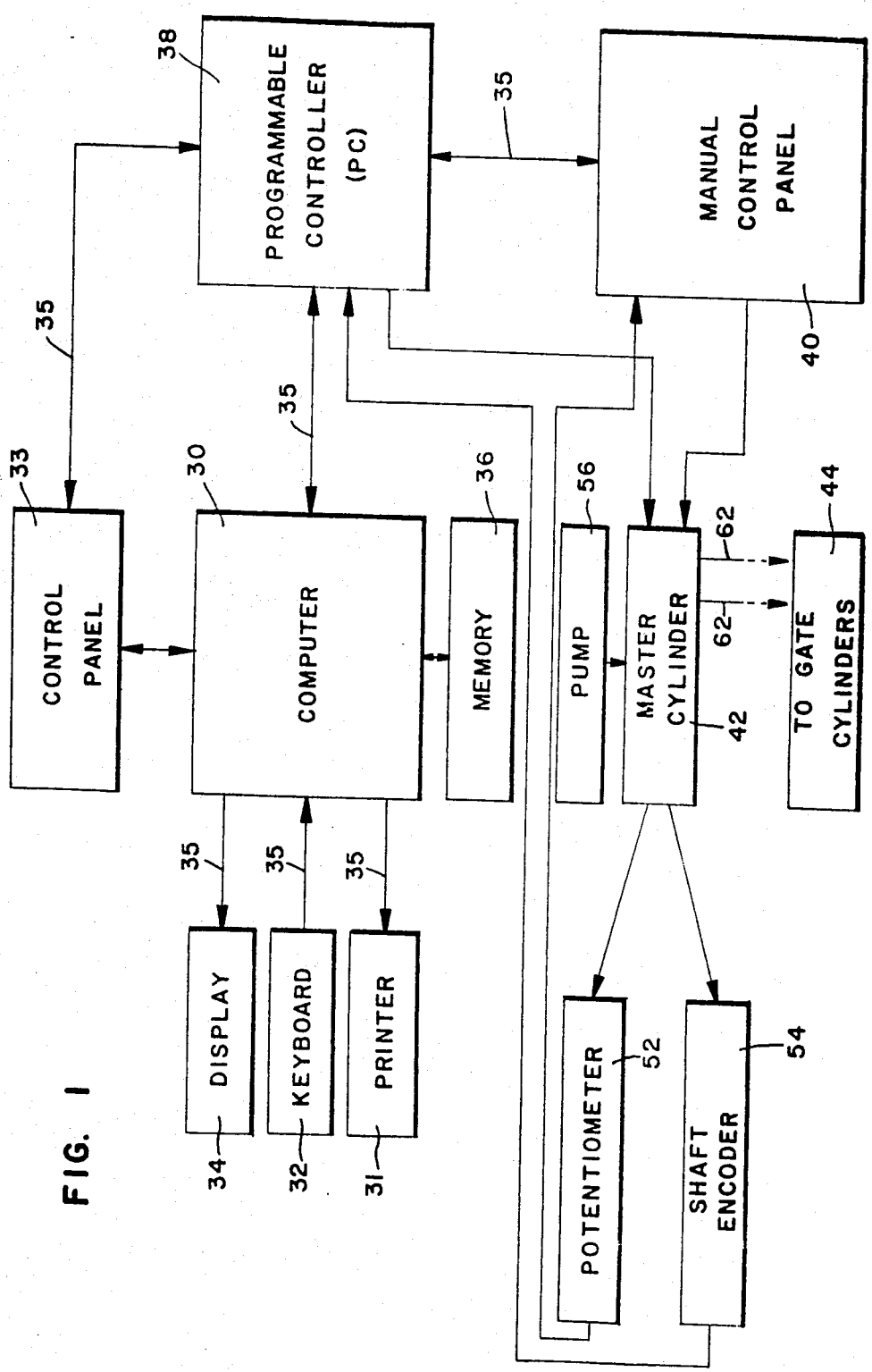
FIG. 1 is a block diagram of the present invention.

A schematic block diagram of an embodiment displaying the principles of the present invention is illustrated in FIG. 1. As illustrated in FIG. 1, the present invention includes a programmed, general purpose computer 30 having a keyboard terminal 32 and a display monitor 34 interconnected thereto. (In one embodiment of the present invention, an Apple II having 48k of memory is utilized.) The computer 30 also has interconnected to it a memory device 36 from which preprogrammed instruction sets are loaded into the memory of the computer 30. Furthermore, a printer 31 is interconnected to the computer 30 for providing hard copy outputs or listings. Communication cables or lines 35 are shown as interconnecting the various elements of the computerized system so as to provide the proper parallel or serial interfacing between the various elements.

A programmable controller 38 is interconnected to the computer for supplying suitable logic to enable interfacing with and control of various elements of the present invention. Suitably interconnected to the programmable controller 38 is a control panel 33 which enables operator input to the controller 38. Also interconnected to the programmable controller 38 is a manual control panel 40 which includes various status indicators and switches for enabling either automatic control of the blending system by the controller 38 or for enabling manual control of the system from the panel 40 by suitable switch settings.

Interconnected to the controller 38 is a master cylinder 42 which is interconnected by hydraulic cylinder lines 62 to a plurality of cylinders 44 located throughout the commodity handling system at various discharge ports of commodity holding bins 46 (see the example of a commodity handling system illustrated in FIG. 2). In particular, the cylinders 44 are operatively connected to gates 48 which regulate the discharge of commodities from the bins 46. Upon activation of the cylinders 44 by the master cylinder 42, the gates are moved so as to open or close the discharge ports of the bins 46 to which they are attached. It will be appreciated that not all the bins 46 require a gate 48 with an actuator 44. Some of the bins may have gates 50 which are manually operated or gates 69 having actuators or cylinders 70 which are not interconnected with the master cylinder 42. Additionally, some of the bins 46 may have a plurality of different types of gates.

Figure 11:
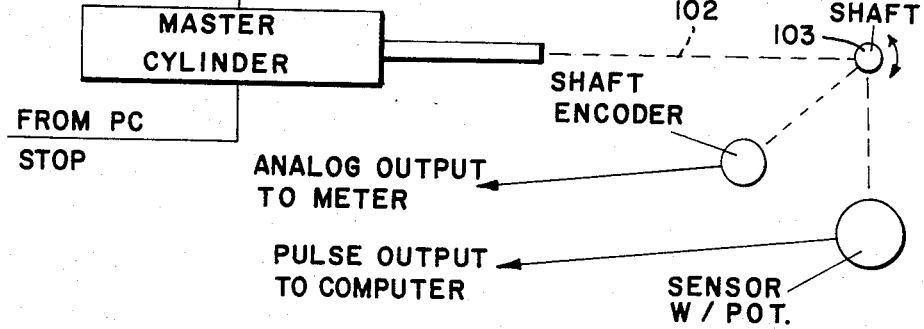
FIG. 11 is a diagrammatic view of the master cylinder and sensors associated therewith.
Figure 12A:
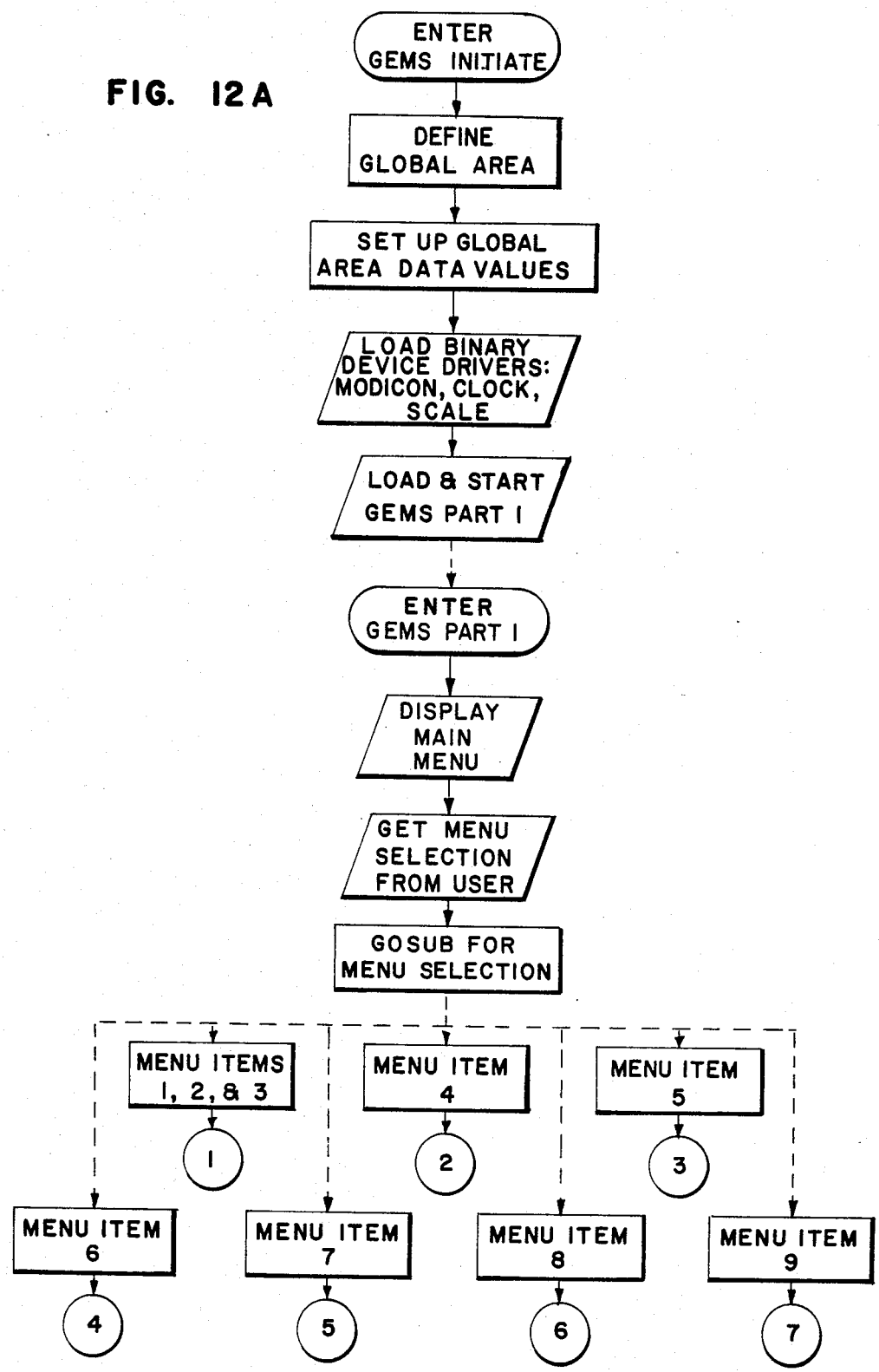
Figure 12B:
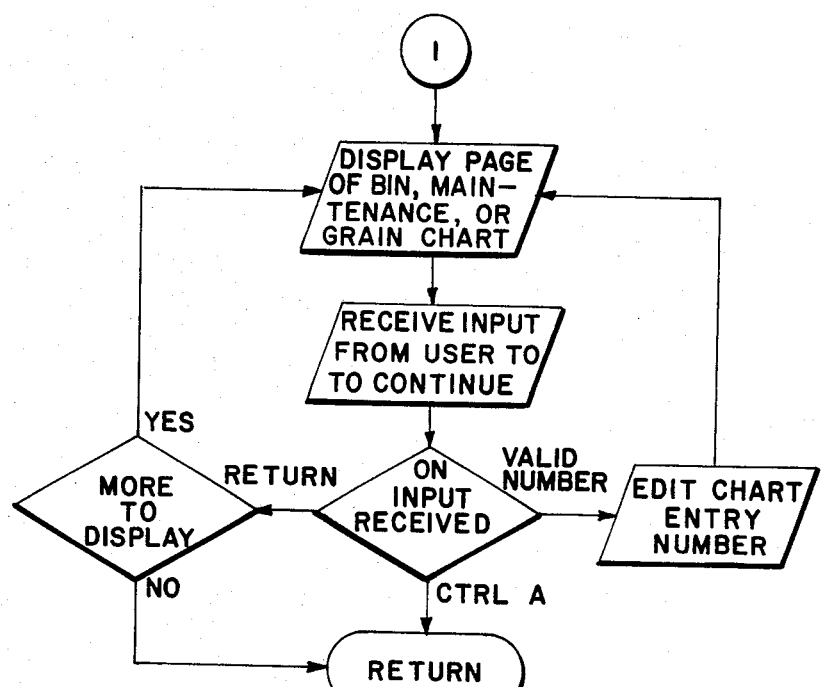
Figure 12C:
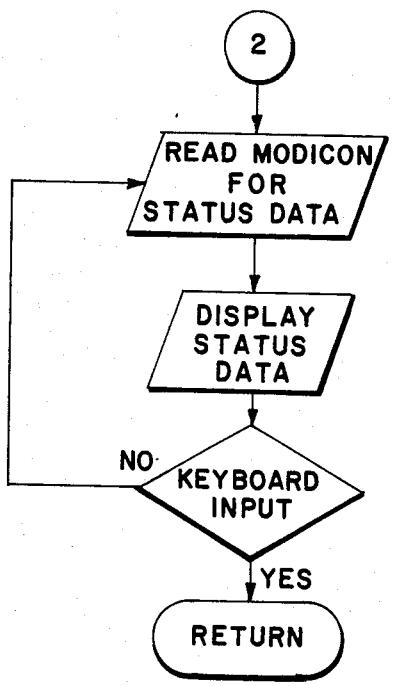
Figure 12D:
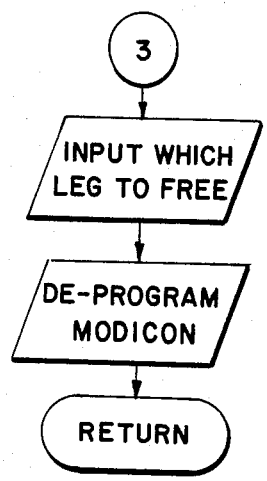
Figure 12E:
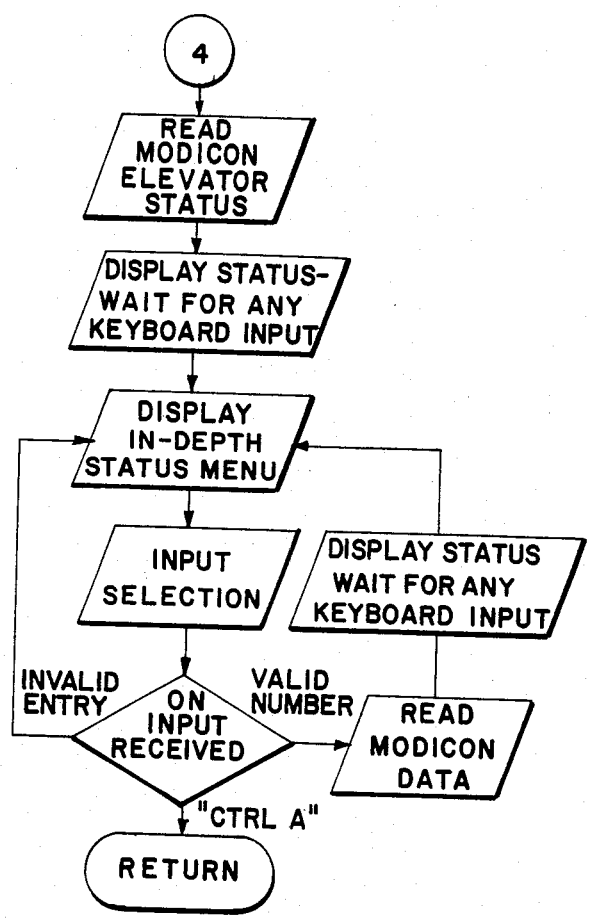
Figure 12F:
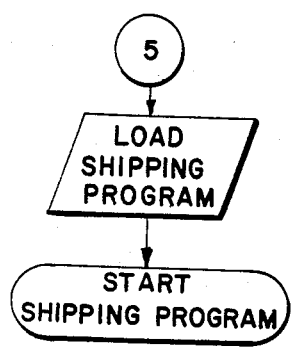

In addition, as illustrated in FIG. 11, the master cylinder 42 is mechanically connected to a potentiometer 52 and a digital shaft encoder 54. In one preferred embodiment, the potentiometer 52 and the encoder 54 are mounted on the same rotatable shaft which is attached mechanically to the hydraulic cylinder 42. The potentiometer 52 and digital shaft encoder 54 detect and monitor movement of the master cylinder 42. The digital shaft encoder 54 is interconnected with the programmable controller 38 to provide digital position information thereto and the potentiometer 52 is interconnected with the manual control panel 40 to provide analog position information thereto. A hydraulic pump system 56 is interconnected with the master cylinder to provide hydraulic fluid under pressure for the proper operation thereof.

A sample commodity handling system environment is illustrated in FIG. 2 wherein commodities are distrubuted by chute apparatus 41 and conveyor apparatus 43 to the bins 46 and/or various vehicles such as train cars 130 and trucks 128. As illustrated in FIG. 2, a distributor apparatus 45 is frequently positioned above the bins for distributing the commodities to various locations.

More particularly, as illustrated in FIG. 13, the master cylinder 42 and the slave cylinders 44 at the various bin gates 48 are conventional double acting, single end rod linear hydraulic devices in that they include a cylinder portion 64 and a piston portion 66 mounted in the cylinder portion for reciprocating movement thereof. The piston portion 66 includes a base portion 68 adjacent the back end 63 of the cylinders and a shank portion 67 extending through the front end 65 of the cylinder portion. Two hydraulic fluid lines 62 are connected to each cylinder such that there is a hydraulic line providing fluid access to the interior of the cylinder portion 64 on either side of the piston base 68. Thus, when hydraulic fluid is forced through one of the conduits 62, the piston portion 66 is caused to move in one of two directions so as to extend or retract. At any given time when the piston portion is in motion, one of the conduits 62 will function as a pressure line for supplying hydraulic fluid to the interior of the cylinder portion 64 while the other line 62 will serve as a return line for fluid leaving the interior of the cylinder. In the embodiment shown in FIG. 3, extension of the slave cylinders 44 will cause the gates 48 to which they are operatively connected to close, while retraction will cause the gates to open. It will be appreciated that any suitable configuration and arrangement of the gates 48 and cylinders 44 which complies with the principles of the invention may be utilized.

Figure 3A:
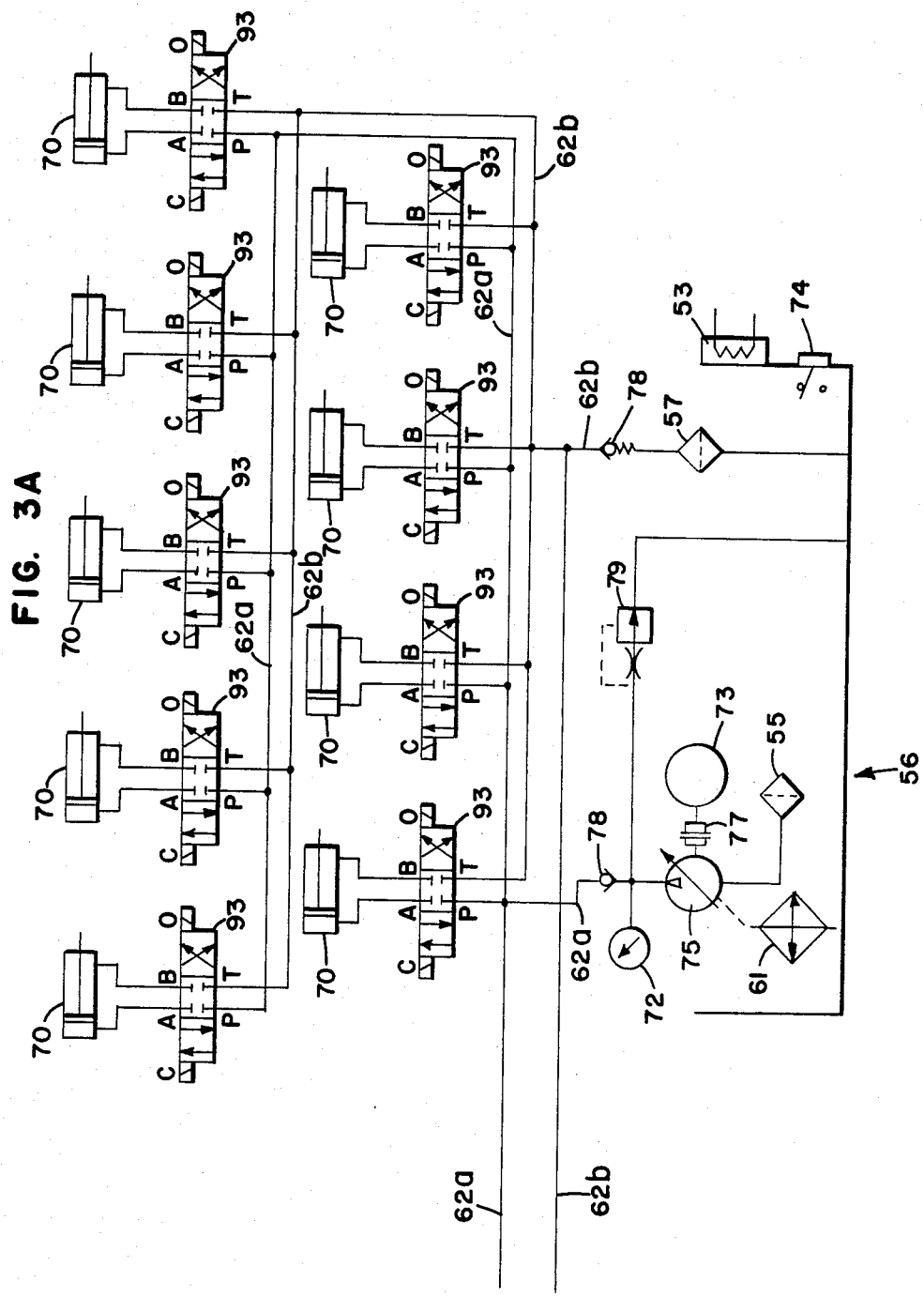
FIGS. 3A and 3B are a hydraulic flow diagram of the gate opening apparatus of the present invention.

As previously mentioned, and as illustrated in FIG. 3A, there may be cylinders 70 operatively connected to four-way valves 93 in the commodity handling system which are connected by hydraulic conduits 62 directly to the pump assembly 56 and are not interconnected to the master cylinder 42.

The pump assembly 56 includes a commercially available self-compensating pump with a pressure gauge 72 and a level switch 74 (such as a pump assembly currently available from Sperry Vickers). The pump system shown utilizes a five-horse power electric motor 73 with 1800 RPM, and a variable displacement, self-compensating unidirectional hydraulic pump 75.

Figure 4:
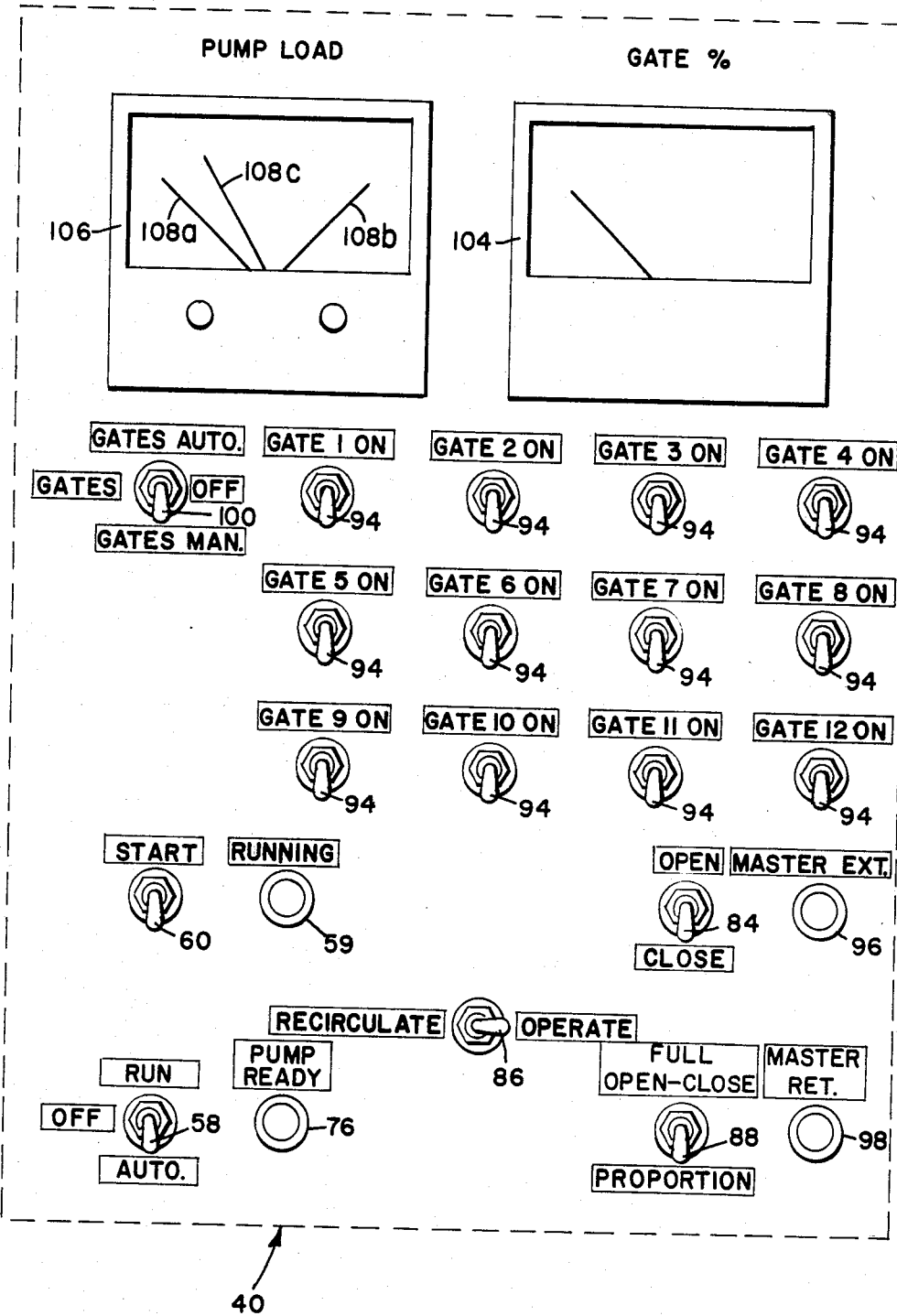
FIG. 4 is a plan view of the front panel of the manual control panel.
Figure 5A:
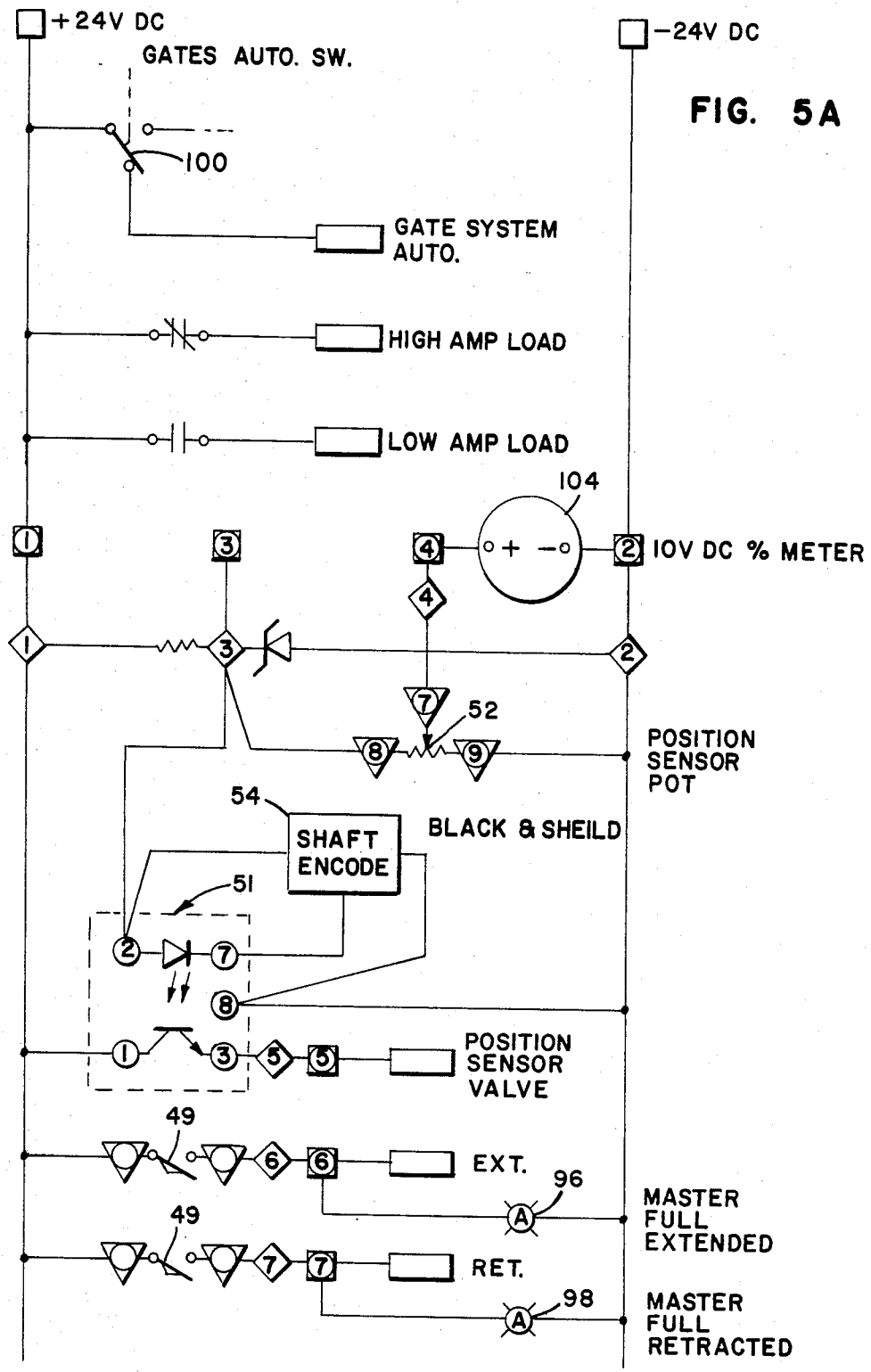
Figure 5C:
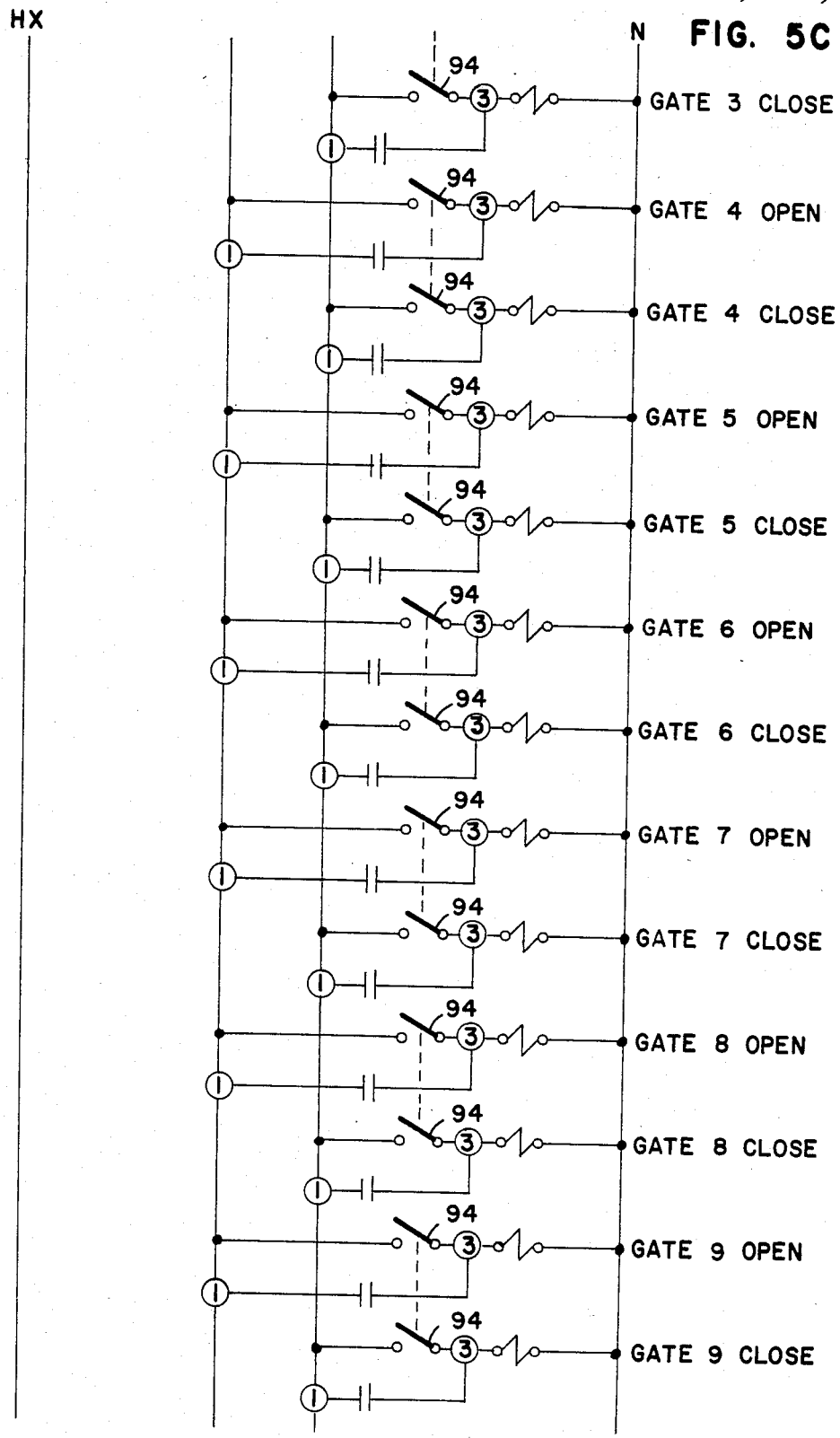
Figure 5D:
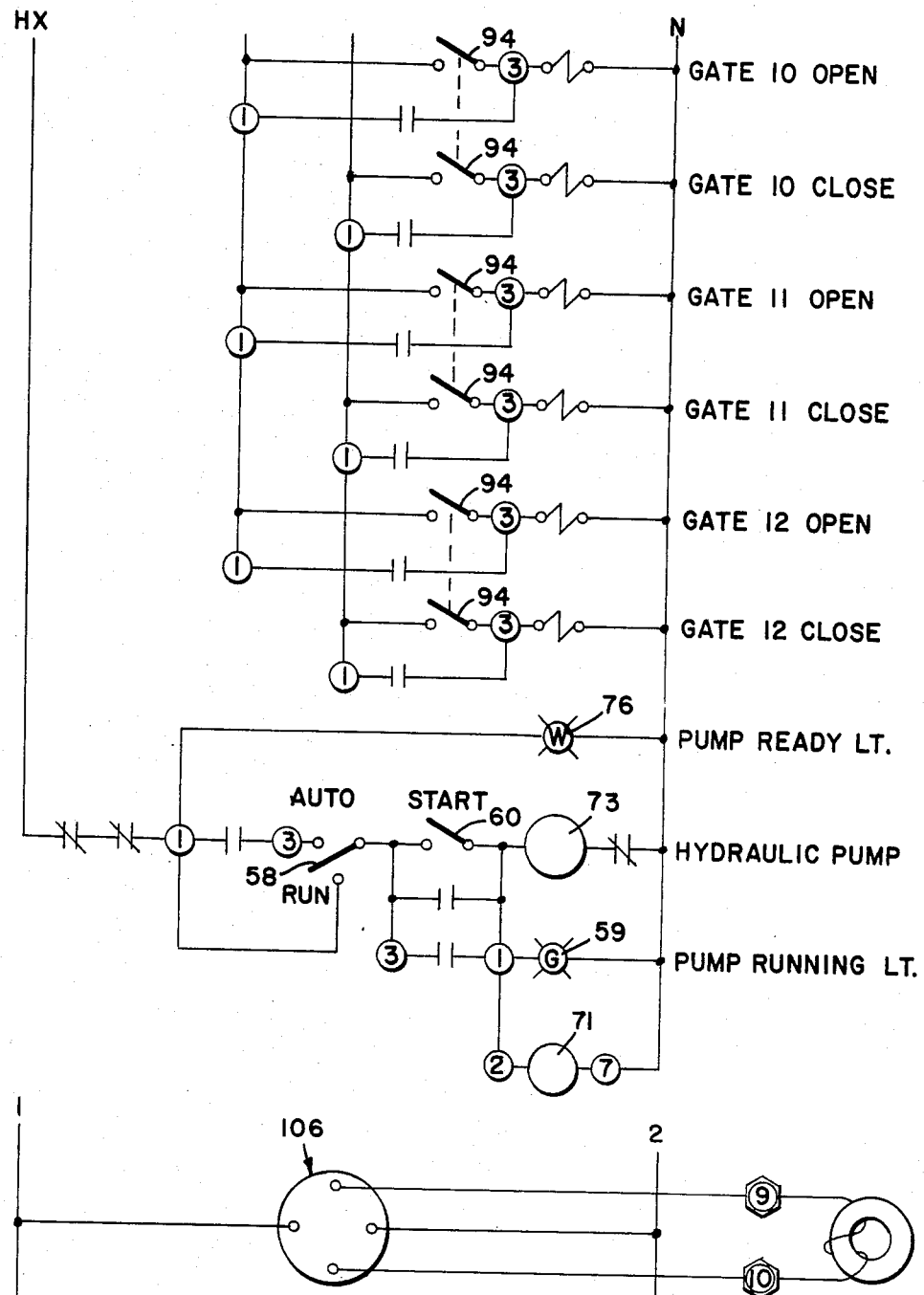

The level switch 74 detects the level of hydrauic fluid in the reservoir and is electrically wires to a pump ready light 76 on the manual panel 40, (see FIGS. 4 and 5). The level switch 74 detects when there is sufficient fluid in the reservoir for pump operation and activates the ready light 76 to indicate such. The pressure gauge 72 is located on a hydraulic fluid line 62a which is the pressure line through which the pump assembly 56 pumps the hydraulic fluid to the various cylinders in the system. The pressure gauge 72 monitors the pressure in the line 62a. Check valves 78 are positioned both in the pressure line 62a and a return line 62b which returns hydraulic fluid to the pump assembly 56. A filter 57 is in the return line 62b to filter the returning hydraulic fluid and a sumpstrainer filter 55 is in the reservoir to filter the oil being pumped from the reservoir. A heater 53 is utilized for heating the hydraulic fluid in the reservoir during cold weather use and a heat exchanger 61 is used to cool the hydraulic fluid during continuous pumping action. A coupling 77 operatively connects the pump 75 to the motor 73. An air bleed valve 79 is itilized to bleed off air in the lines.

As indicated in FIG. 4 and the electrical circuit diagram of FIG. 5, the pump assembly 56 is wired to a three-position run/off/auto switch 58 on the manual panel 40, and to a start switch 60. The switch 58 must be in the auto setting in order to enable the programmable controller 38 to start the pump as required. The pump is switched off with the switch in the off setting. By putting switch 58 in the run setting, an operator can manually start the pump by setting the start switch 60 in the start position. Upon starting, the pump assembly 56 is wired such that an indicator 59 is lit on the manual panel 40, indicating that the pump is running. In addition, a contact relay 71 informs the controller 38 that the pump 75 is running.

Furthermore, the pump assembly 56 is wired to include a set point ammeter 106 which is positioned on the manual panel 40. The ammeter provides a measure of the current load on the pump motor 73. The ammeter includes two adjustable needles 108a, b, one of which is positioned at the low end of the gauge and the other of which is positioned at the high end of the gauge. When the pump assembly 56 initially begins to pump hydraulic fluid, a monitoring needle 108c will surge above the lower level needle 108a and then settle back down and gradually rise toward the upper end needle 108b. When the upper end needle 108b is reached, the pump is shifted into a recirculating mode so as to not build up pressure and self-destruct. By monitoring the ammeter 106 at the manual panel 40, an operator can tell when a gate is fully closed or open during manual operation.

Figure 3B:
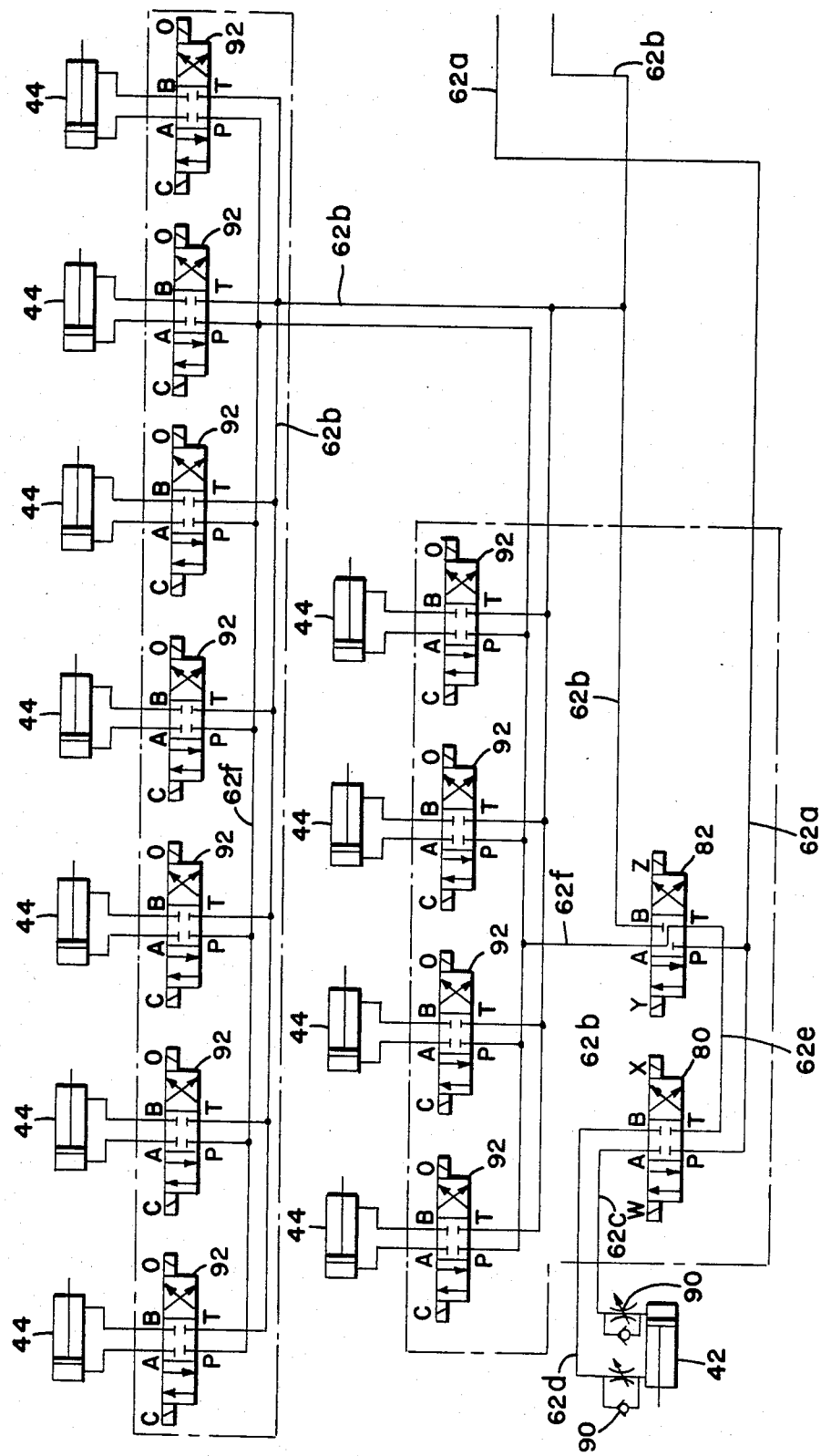

As illustrated in FIGS. 3A and 3B, the pressure line 62a is interconnected to two four-way valves 80 and 82 hereafter referred to as the master cylinder valve 80 and the mode control valve 82, respectively. Each of the valves 80, 82 have three different operational states. Activation of the valves 80, 82 to these operational states is accomplished by activating one of two solenoids indicated by W and X and Y and Z, respectively, associated with the valves, or by deactivating both of the solenoids.

Activation and deactivation of the respective solenoids for the various valves is accomplished under control of the programmable controller 38; however, the valves are also electrically wired to the manual panel 40 such that they may be manually controlled. The master cylinder valve 80 is electrically wired to an open/close switch 84 on the manual panel 40. The switch 84 is a three-position switch which is spring biased to an off position wherein neither solenoid W or X is activated. Holding switch 84 to the open position, activates solenoid W and setting switch 84 to the closed position activates solenoid X. When neither solenoid is activated, the valve is in the configuration shown in FIG. 3B.

The mode control valve 82 is electrically wired to a recirculate/operate switch 86 and a full open-close/proportional switch 88 on the control panel 40. Setting the switch 86 to the recirculate position activates solenoid Z. Setting the switch 86 to the operate position and the switch 88 to the full open-close position activates solenoid Y. Setting the switch 86 to the operate position and the switch 88 to the proportional position deactivates both solenoids X and Y.

The switches 84, 86 and 88 are wired such that when the switch 86 is set to the recirculate position, the switches 84 and 88 are inoperative and have no effect on the hydraulic fluid flow.

When switch 86 is set to the recirculate position, hydraulic fluid flows from pressure line 62a to port T on one side of the flow control valve 82 and through the valve 82 to the return line 62b connected at port B on the other side of the mode control valve 82. Thus, the hydraulic fluid is pumped by the pump assembly 56 through the pressure line 62a, the valve 82 and the return line 62b back to the pump assembly 56. The hydraulic fluid is thus recirculated from the pump back to its reservoir and does not go to the cylinders 42 and 44.

When the switch 84 is in the open position, and the switch 86 is in the operate position, solenoid W is activated thereby enabling hydraulic fluid to flow from pressure line 62a through the master cylinder valve 80 between ports P and A and into line 62c. Line 62c is attached to the master cylinder 42 near the back end thereof so as to deliver hydraulic fluid to the interior of the cylinder portion between the space defined by the piston base portion and the back end of the cylinder portion such that the shank portion of the piston is extended from the front end of the cylinder 42. Extension of the piston portion 66 causes hydraulic fluid to be forced out of the hydraulic cylinder 42 and into line 66d which is connected to the cylinder portion proximate the front end of the cylinder so as to be between the front end of the cylinder and the base portion of the piston. Flow control valves 90 are illustrated as being positioned in each of the hydraulic fluid lines 66c, d. The hydraulic fluid forced into line 66d under pressure flows through the valve 80 between ports B and T and to the valve 82 through the hydraulic conduit portion 66e. If the switch 86 is set to operate and if the switch 88 is set to proportional, none of the solenoids Y or Z will be actuated. The valve 82 will have the configuration shown in FIG. 3 and will enable hydraulic fluid to flow through the valve between ports T and A and into hydraulic line 66f, which serves as a pressure line providing hydraulic fluid to the cylinders 44 at the various gates 48.

It will be appreciated, that when the switch 88 is in the proportional setting as previously mentioned, the solenoids of valve 82 are both deactivated such that the four-way valve 82 only allows hydraulic fluid from the master cylinder 42 to flow therethrough and into line 62f. Hydraulic fluid in line 62a from the hydraulic pump assembly 56 is not allowed to flow therethrough. This configuration is significant in that increased pressure in the fluid lines 62e and 62f is obtained. This is due primarily to the fact that as illustrated in FIG. 13, the pump assembly 56 is providing hydraulic fluid under pressure into the back end 63 of the master cylinder such that the fluid is pushing on the relatively large surface area of the piston base portion 68. On the other side of the base portion 68, there is reduced surface area for the fluid to exert a force due to the fact that a portion of this area is occupied by the shank 67 of the piston 66. This results in increased pressure being exerted. In a typical application, the applicant has found the reduction in surface area to be approximately 40% which results in an increased pressure of approximately four times that of the pump-supplied pressure.

Each of the cylinders 44 at the various gates 48 is connected to a four-way valve 92 which in turn is connected to the pressure line 62f and the return line 62b. Each of the valves 92 has two solenoids, represented as C and O in FIG. 3, associated therewith. As illustrated in FIGS. 4 and 5, each of the valves are electrically connected to switches 94 on the manual panel 40. The switches 94 are two positions on/off switches which are biased to the off position such that they must be held in the on position. The switches are wired to cooperate with the open/close switch 84 such that when switch 84 is in the open position and the switches 94 are held in the on position, the solenoid O is activated. The hydraulic fluid is then able to flow from the pressure line 62f through the valve 92 between ports P and B and into the front end of the cylinder 44 so as to cause the piston portion to retract and open the associated gate 48. Hydraulic fluid in turn is forced out the other end of the cylinder 44, through the valve 94 between ports A and T and into the return line 62b which returns the fluid to the pump assembly 56. As mentioned, typically the cylinders 44 are mechanically attached to the gates 48 of the bins or containers 46 such that when the cylinders 44 retract, the gates are opened. Typically only one switch 94 will be held in the on position at any given time in conjunction with the open-close switch 84 such that only one gate at a time is opened. The master cylinder 42 is then retracted by setting the switch 84 in the close position and switch 88 in the full open-close position. The next gate is opened by setting the switch 84 to the open position, the switch 88 to the proportion position, and the appropriate switch 94 to the on position.

Typically, to close the gates 48, the switch 88 is set to the full open-close position thereby activating solenoid Y of the mode control valve 82 and the switch 84 is set to the close position thereby activating solenoid X of the master cylinder valve 80. In addition, the switch 94 corresponding to the gate to be closed is held in the on position thereby activating solenoid C of the corresponding gate cylinder valve 92. Consequently, hydraulic fluid is able to flow in pressure line 62a from the pump assembly 56 through the valve 82 between ports P and A and into pressure line 62f. The fluid then flows between the ports P and A of the valve 92 whose solenoid C is activated, thereby entering the cylinder 60 at the back end thereof so as to cause the extension of the piston portion 66 through the front end of the cylinder which in turn causes the gate 48 to close.

Additionally the gates 48 might be closed by setting switch 88 in the proportion setting, switch 84 in the close setting, and the switch 94 associated with the gate 48 to be closed in the on position. This will enable fluid to flow from the conduit 62a and between ports P and B of the valve 80 to the conduit 62d. Hydraulic fluid then flows out conduit 62c and into conduit 62e between the ports A and T of the valve 80. From the hydraulic line 62e the fluid flows between the ports T and A of the valve 82 into line 62f. The hydraulic fluid then follows the same path as before through the appropriate valve 92 to cause extension of the piston portion and consequently the closing of the gate as required.

It will be appreciated that by locating the master cylinder 42 and its associated pump assembly 56 along with the four-way routing valves at a central location within the commodity handling system, the amount of hydraulic conduit required can be reduced.

As illustrated in FIG. 4, on the panel 40 are located two indicator lights 96 and 98 which are wired to limit switches 49 so as to indicate the retraction or extension status of the master cylinder.

Additionally, as illustrated in FIG. 4, and the electrical schematic diagram of FIG. 5, there is a three-position switch 100 on the manual panel 40 which has the settings auto/off/manual. In the auto setting, as is indicated in the electrical schematic of FIG. 5, the controller 38 is able to exercise control over the closing and opening of the gate 48 selected by an operator at the keyboard terminal 32. When the switch 100 is in the off position, no control of the gates, either automatic or manual is allowed. In the manual setting, the operator is able to use the various switches 94, 86, 84, 88, etc. to control the opening and closing of the gates 48 from the control panel 40. It will be appreciated, that when the switch 100 is in the auto position, the controller 98 will be activating the valves 80, 82, 92 by the use of contact relays as illustrated in FIG. 5 in a manner similar to that of the operator when manually activating the valves 80, 82, 92 by use of the switches 94, 88, 86 and 84.

As previously mentioned, the master cylinder 42 as diagrammatically illustrated in FIG. 11, is mechanically connected by a cable 102 or the like to a rotatable shaft 103. The potentiometer 52 and the digital shaft encoder 54 are mechanically connected to the shaft 103. As the master cylinder piston portion extends or retracts, the potentiometer provides an analog output or signal indicative of the piston position and consequently, the gate position. In one embodiment, the potentiometer 52 and the associated limit switches 49 are purchased as commercially available item, referred to as a "position transmitter", which is available from ASI Keystone, Houston, Texas. (The part number is 77RS-3-2.5-2LS.) A digital encoder 54 is attached onto a shaft extending from this unit and a cable in turn is connected between the shaft and the piston portion of the master cylinder 42. As the shaft turns and the cable is wound or unwound, the limit switches 49 are tripped by a cam on the shaft when the master cylinder 42 is fully extended or retracted. As indicated in FIG. 5A, the controller 38 is informed of shaft encoder movement and full extension or retraction cylinder status. The shaft encoder 54 output is isolated from controller 38 input by a photo isolator relay 51. A needle gauge 104 on the manual panel 40 is electrically wired to the potentiometer to provide a continuous analog readout such that the operator has an indication of where the gate is positioned. The digital shaft encoder 54 provides discrete digital pulses to the controller 38 as the piston moves during the opening or closing process thereby informing the controlling program on gate position.

Program Control

It will be appreciated by those skilled in the art, that many factors affect the flow of a commodity through a gate opening. Even the same size gate will not necessarily provide the same flow rate of material due to bin structure, gate structure, angle/size of the discharge spouting, etc. Consequently, in order to enable operator selection of the percentage of blend or flow rate for each commodity selected, these various stages of gate openings must be calibrated to correlate them to the rate of discharge. Additionally, when discharging various commodities from a plurality of bins onto a conveying system, the maximum capacity of the conveying system must be considered such that the conveying system is not overloaded, resulting in commodity loss or damage to the system.

At installation of the present invention, each of the gates 48 must therefore be calibrated to derive the relationship between gate opening and commodity rate of flow therethrough. This is accomplished by placing the gate in a closed position and then gradually opening the gate by fixed increments of movement. At each position, or increment, the gate is left open a predetermined amount of time and commodity is discharged therethrough. At the end of the time interval, the commodity is weighed. Based on the weight of the commodity and the density of the commodity, the flow rate per interval of time can be determined.

The applicant has found two counts or two interrupts from the shaft encoder as an effective increment of movement and 60 seconds as an effective time increment. From the information obtained therefrom, the applicant has been able to accurately calculate flow rate in bushels per hour (BPH).

Calibration of each gate is stopped when the maximum flow rate for that gate is reached. An example of results that might be derived is as follows:

| Counts | BPH |
|--------|-----|
| 2 | 500 |
| 4 | 700 |
| 6 | 900 |
| etc. | etc. |

The results can then be plotted on a graph of counts versus bushels per hour (BPH).

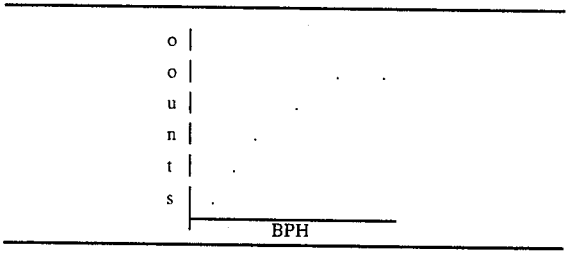

The data points should all lie along a gradual curve. Those points that are significantly off the curve can be discarded and regarded as being invalid data. After plotting the points to determine the valid data points, the data points can be run through a standard regression program to determine the polynomial coefficients of an nth degree polynomial equation which approximates the curve form and expresses the relationship between counts or movement, and the flow rate or bushels per hour. (See appendix for calibration program listing and regression program listing.) The applicant has found that a third degree polynomial is usually sufficient.

The following is an example of a third degree polynomial: $Y = C3X^3 + C2X^2 + C1X^1 + C0$.

Where:
- $Y$ = counts
- $X$ = BPH

The calibration process is performed on each gate for which the operator will be able to select the percentage of blend or flow rate. The coefficients calculated are stored in a coefficient table in the computer memory for later use by the computer program.

For a third degree polynomial, the coefficient table might have the following form:

| Gate | C0 | C1 | C2 | C3 |
|------|----|----|----|----|
| 1 | 4 | 5 | 1 | 8.5 |
| 2 | 2 | 7 | 3 | 5 |
| 3 | 1 | 1.5 | 2 | 3 |
| . | . | . | . | . |
| . | . | . | . | . |
| . | . | . | . | . |
| N | . | . | . | . | where: C0 is the constant, C1 is the first degree coefficient, C2 is the second degree coefficient, and C3 is the third degree coefficient.

There will be N sets of coefficients, one set for each gate utilized. In the commodity system illustrated in FIG. 2, there are 11 bins with the gates 48 for which the percentage of blend can be selected. Consequently, for this system there will be 11 sets of coefficients.

Additionally, the maximum flow capacity of each conveyor device utilized in the system must be determined and saved in memory as a conveyor restriction table (CT) for later use by the computer program. In the embodiment illustrated in FIG. 2 of the conveyor apparatus 43, there are four generally horizontal conveyors 121, 122, 123 and 124 and one hopper or container 125 for a total of five times along and through which the commodity discharged from the gates 48 may be conveyed. For such a system the conveyor table might appear as follows, there being one set of entries for each conveying item (five for the embodiment shown in FIG. 2):

| Conveyor | MAX | CURRENT |
|----------|-----|---------|
| 1 | 3000 | 1000 |
| 2 | 3000 | 2500 |
| 3 | 22,000 | 15000 |
| 4 | 25,000 | 17000 |
| 5 | 12,000 | 10000 | where: MAX is the maximum capacity, CURRENT is the current load on the conveyor.

It will be appreciated that one entry for each of the items reflects the current load on each of the conveyors as determined by the computer program. The current load will change as the various commodities are discharged onto the conveyor from the various bins. The computer program will check to make sure that the maximum capacity is not exceeded by the current load.

Additionally, a bin table (BT) having three entries per gate is stored in memory. Below is an example of such a table:

| Gate | Counts | Flow Rate | Conveyor |
|------|--------|-----------|----------|
| 1 | 20 | 1 | 121 |
| 2 | 24 | 1 | 122 |
| 3 | 18 | 1 | 121 |
| . | . | . | . |
| . | . | . | . |
| N | . | . | . |

For the embodiment shown in FIG. 2, the number of gates will once again be 11. The counts entry indicate which position the maximum flow rate of the gate is reached. The flow rate entry is typically set to one, but may be modified for special conditions, e.g., excessive moisture in the grain, etc. The conveyor entry identifies the conveying device unto which the gate will be discharging. For example, in the embodiment illustrated in FIG. 2, this entry would either be conveyor 121, 122, 123 or 124, depending on the gate selected.

The calibration process need only be performed at system installation, or when a gate is added to the system or is modified. It will be appreciated that the above table examples were meant to be illustrative only and not reflective of actual system data.

Figure 8:
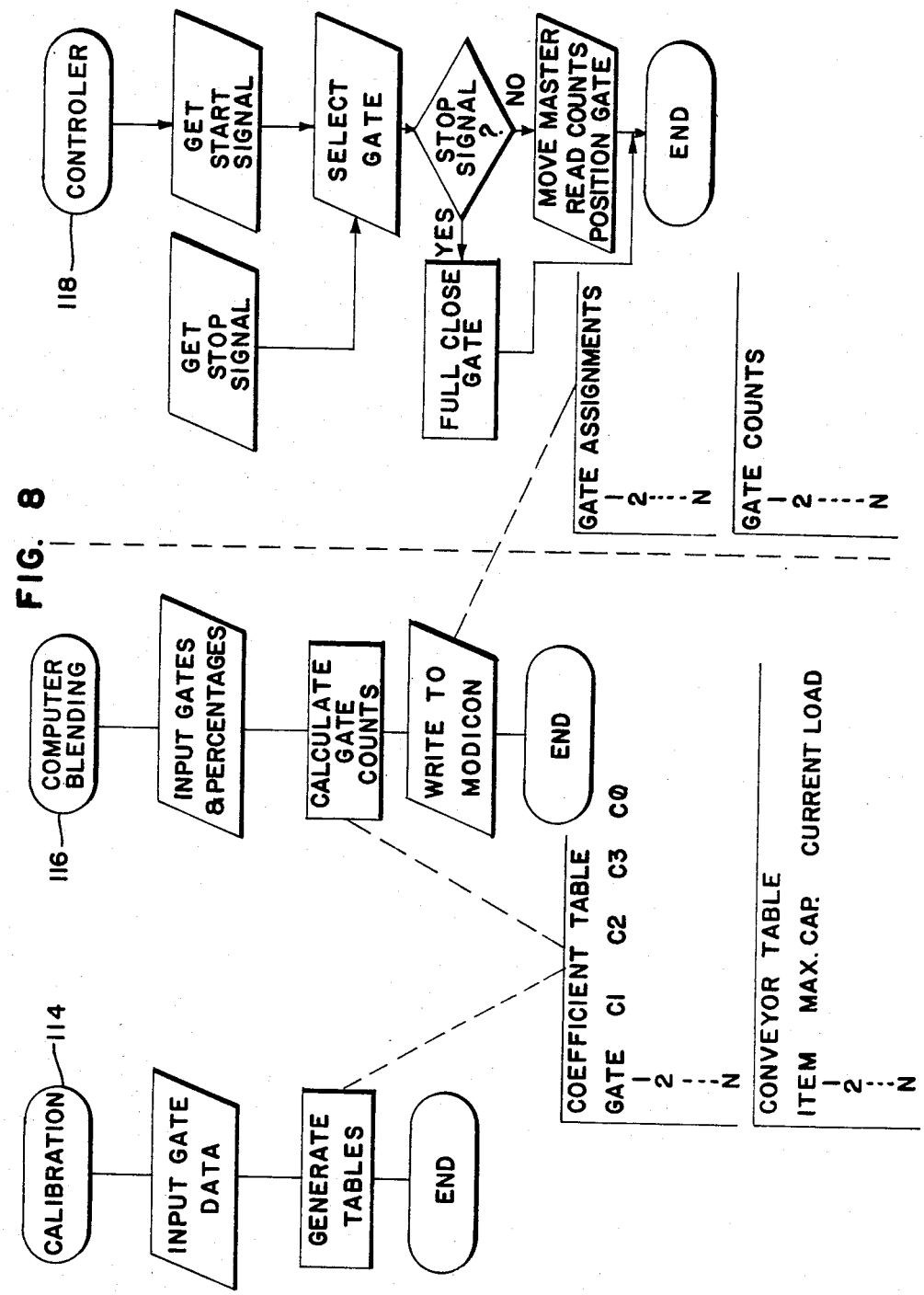
FIG. 8 is a logic flow diagram of the calibration, blending and controller functions.

As illustrated in FIG. 8, once the gates are calibrated by the calibration function 114, a preprogrammed instruction set is loaded into the computer 30 and the programmable controller, thereby enabling the operator to select the gates and relative percentages of commodity therefrom and further enabling implementation of the operator's request. The general functions and interrelationship of the calibration/regression function 114, the blending function of the computer 116 and the gate control function 118 of the controller is illustrated in FIG. 8.

It will be understood that the preprogrammed instruction sets utilized in the computer 30 and the controller 38 may have varying forms and yet be in accordance with the principles of the present invention. From the keyboard 32, the operator will enter in a predetermined format, the information which is necessary to enable the programmable controller 38 to initiate and control the gate blending process for a particular blending run.

One embodiment of such a display format is illustrated in FIG. 6. In the embodiment shown, the operator enters the identifier of the leg or bucket conveyor to which the commodities are to be conveyed. In the system shown in FIG. 2, there are two such bucket conveyors 126, 127. The identifiers for the gates from which commodity is to be discharged are also entered. In the embodiment shown, the operator is limited to selecting for any given blending run at most three gates. Below the gate entries, the operator enters the blend percentages of each gate. Each percentage entered represents the relative proportion of the entire delivery to the legs which the commodity discharged from that gate is to represent. The total of the percentages entered must equal 100%.

In one embodiment of the present invention, entries are also made indicating the primary and alternative destination bins such that if the primary bin is filled, the computer program can instruct the system to fill the alternate bin. An entry indicating the type of grain blend selected is also made. If the destination of the blended commodities as to a bin rather than to a truck 128 or train 130 (see FIG. 2), the destination bin is verified to contain the blend type selected. If the destination bin does not contain the designated blend type, then the process is aborted. Finally, the operator selects the total bushels per hour flow rate of all the commodities combined.

Upon verifying his/her entries, the operator transmits the data to the computer by the appropriate transmit action. Upon receipt of the operator entries, the preprogrammed instruction set in the computer 30 will calculate for each gate selected the amount of opening required in terms of digital encoder counts or interrupts so as to derive the operator selected blend percentage from each gate. In addition, the program will check to make sure that the maximum capacity limits as specified in the conveyor table for the individual conveying devices and the bin table for the individual gates are not exceeded. If any of these maximum limits are exceeded, the program will reduce the requested bushels per hour total flow rate to a rate wherein none of the limits are exceeded. In one embodiment, this is done by increments of 100 BPH. Once the program has determined the number of counts required to open each gate, this information is transferred to the programmable controller as illustrated in FIG. 8 so as to provide the programmable controller 38 with the number of counts required to open each of the selected gates and the assignment information for each gate, indicating to which conveyor bucket or leg the gates are assigned.

Figure 9:
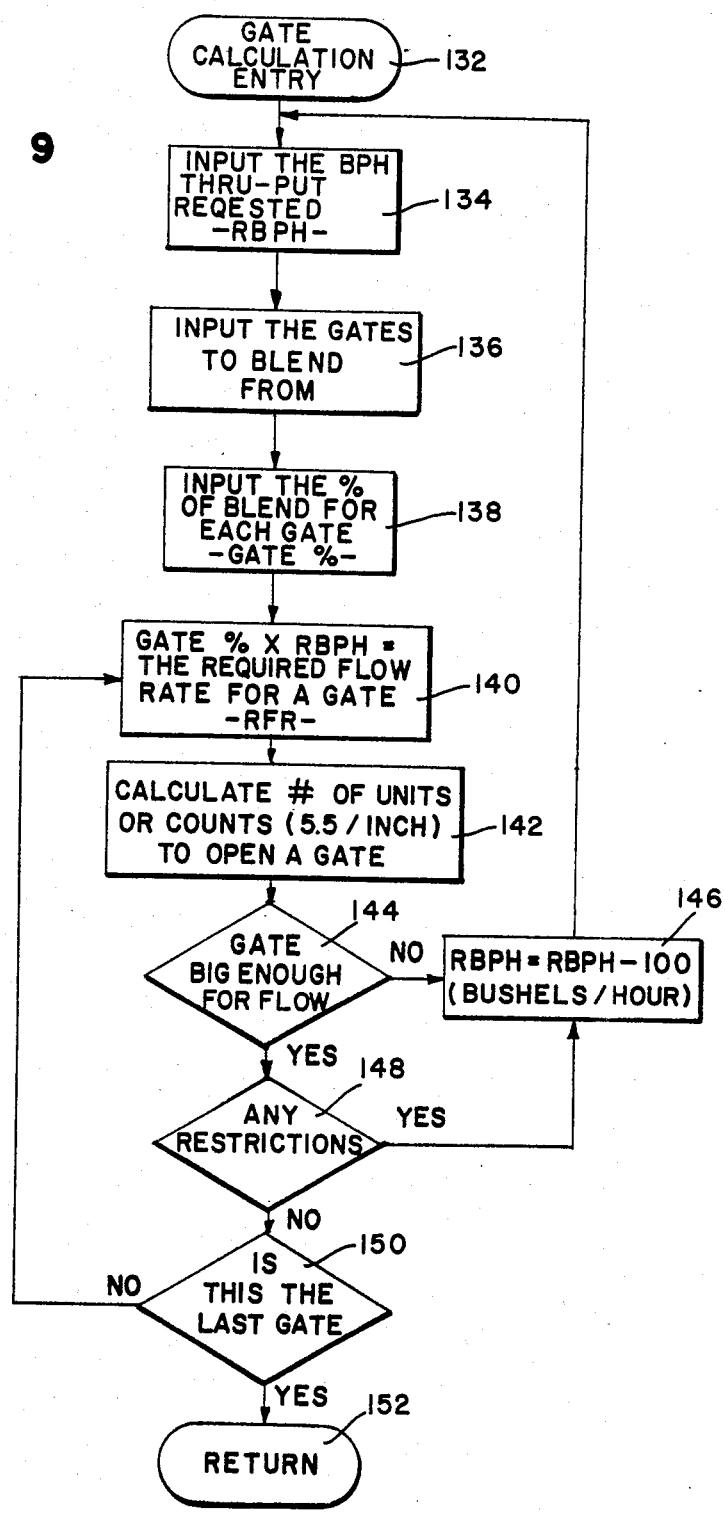
FIG. 9 is a logic flow diagram of the gate calculation routine.
Figure 12G:
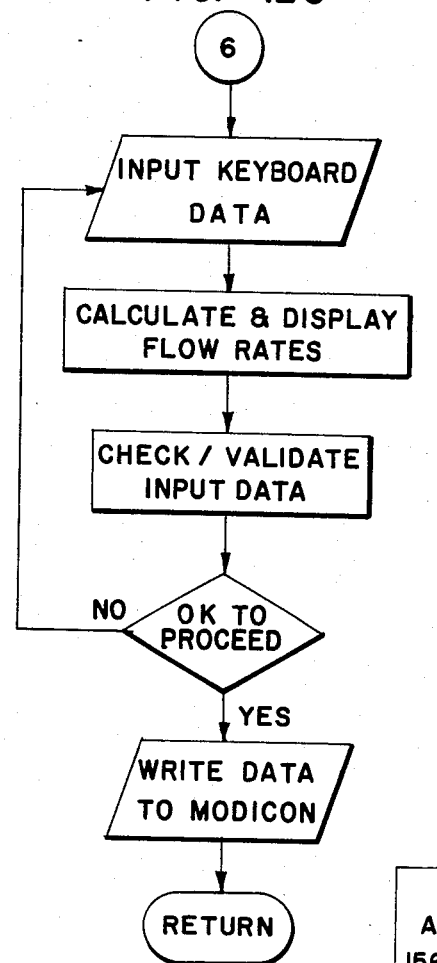
FIGS. 12A–12H are a logic flow diagram of a grain elevator management system incorporating the present invention.
Figure 12H:
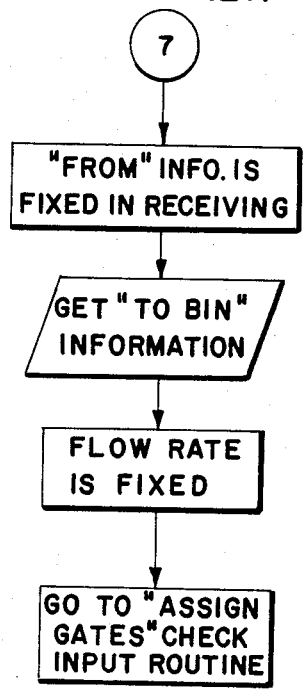

A flow diagram for the gate calculation subroutine which determines the number of counts to open each gate is illustrated in FIG. 9. The entry to the subroutine is at block 132. At blocks 134, 136, and 138 the requested flow rate in bushels per hour, the gates to be blended, and the relative blend percentages for one gate as selected by the operator are input. At block 140, the required flow rate for one gate is defined by multiplying the gate percentage selected times the total flow rate requested in bushels per hour. At 142 the number of counts required to open the gate to the calculated flow rate thereof is determined by use of a third degree polynomial with the coefficients being obtained from the coefficients table. A check is then made at 144 to see if the gate is large enough for such a flow rate. This is accomplished by comparing the calculated number of counts to the maximum number of counts listed in the bin table. If the gate isn't large enough, then at 144, 100 BPH is subtracted from the requested total flow rate and the program goes back to the beginning of the subroutine. New calculations are now performed for the new requested flow rate, which is 100 bushels per hour less than the original requested flow rate. If at block 142 it was determined that the gate was large enough for the requested flow rate, at block 146 a check is made to see if the maximum capacity flow rate of any of the conveying devices is exceeded. This is accomplished by checking the maximum capacity provided in the conveyor table. If any of the maximum capacities is exceeded, once again 100 bushels per hour is subtracted from the total requested flow rate and new calculations are performed in light of the reduced total flow rate. If at 148 it was determined that the maximum capacities were not exceeded, a check is made at 150 to determine whether this is the last gate. If it is not the last gate, the program goes back to 140 to calculate the next gate's flow rate. Once the count for the last gate has been determined, an exit is performed from the routine at 152.

As previously mentioned, and as illustrated in FIG. 8, once the number of counts required to open each of the gates is determined, this information is transferred to the programmable controller 38 along with the gate leg or zone assignments. The programmable controller utilized in one embodiment of the present convention is a commercially available (MODICON) Model 484-05 with enhanced II instruction set. It has 4,096 bits of memory which are protected against alternating current power outages by battery backup. The MODICON is equipped with B553 and B552 universal direct current input and output modules, respectively, with four circuits per module.

Programmable controller has 53 registers, whichare used as a communication buffer for the programmed instruction set in the computer. There are 24 gate assignment registers which are utilized to assign particular gates to particular legs or conveyor buckets. Additionally, there are four zone status registers which may be altered by the computer or the controller. These registers indicate the status of a particular conveyor bucket or leg. Examples of zone status are as follows: 000=the particular conveyor bucket or leg is ready to start, but it is not yet running and it is ok for the operator to reprogram the computer. 001=the gates are open. 512=the zone is complete and it is ok to reprogram the computer. 002-511=error message which are custom defined for each particular system installation. When an error message is detected, the registers must not be changed.

Because the controller 38 can communicate with up to four computers, it is necessary for the controller to know what computer it is currently interfacing with. This is accomplished by each of the computers writing their identifier into a register, when they are actively communicating with the controller. Once the communications with the particular computer are completed, the register is cleared.

There are also 24 gate percentage registers, or gate count registers. These registers contain the required computer calaculated gate opening in counts or percent of master cylinder travel.

Figure 10:
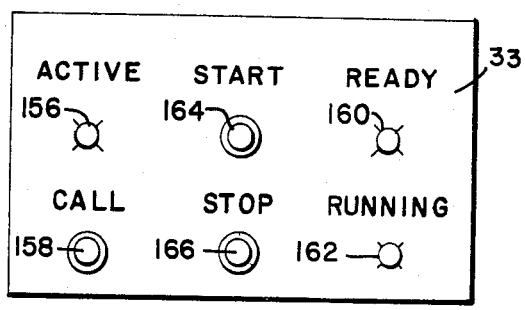
FIG. 10 is a plan view of the computer control panel.

As illustrated in FIG. 10, the control panel 33 adjacent the computer 30, has a ready light 160 which indicates that the gate assignment and gate count information has been sent to the programmable controller. If the programmable controller detects an error or a problem, the ready light 160 will be cleared. An active light 156 on the control panel indicates when the computer is communicating with the programmable controller. It will be flashing if another computer is also using the programmable controller 38.

By pushing a start button 164 on the control panel 33, the blending process as programmed by the operator will be started. However, if the programmable controller has detected some error condition and the ready light is not lit, the process will not be started. As indicated in FIG. 8, upon detecting a start button input and a zero or ready status in the zone status register, the programmable controller will scan the gate assignment registers to see which gates are to be opened. When the controller finds a matching zone number, it will transfer the appropriate gate count from the gate count registers to a master cylinder position counter register. Similar to the manual operation, the appropriate four-way gate valves are energized and the master cylinder starts pushing oil to the selected gates. As previously discussed, while the master cylinder is moving, the shaft encoder 54 turns and the potentiometer 52 turns. The interrupts from the shaft encoder 54 are stored at the position counter register. The meter readout on the manual panel 40 registers master cylinder position in percentage of travel based on the potentiometer 52 inputs. When the actual count in the master cylinder position counter equals the set point count register value, the master cylinder will be stopped and the selected gate valve is deenergized and the master cylinder retracted.

The controller will then continue to scan the gate assignment registers looking for another gate assigned to the zone or bucket conveyor selected by the operator. If one is found, the process is repeated as with the first gate and so on, for up to a maximum of three gates in the embodiment illustrated. If no other gate is found within one second, the master cylinder is retracted and the green running light 162 on the control panel is lit, indicating all gates are open.

If the operator pushes a stop button 166, the controller will scan the gate assignment registers looking for gates assigned to the selected zone. As gates are found which are assigned to the zone, the appropriate four-way valves 92 are activated to the close position for all the gates assigned and the mode control valve 82 is energized to the full open-close postion, thereby forcing oil through all the activated gates valves 92. These valves remain energized for a period of five seconds, which allows enough time for all gates to close. Then the green running light 162 is deenergized and the zone is ready to start again.

The ready light 166 can be shut off and a zone complete status written into the zone status register by pushing a call button 158 and the stop button 166 at the same time. This will disable zones from starting and stopping until the gates are reassigned by the computer.

It will be appreciated that the present invention may be utilized in a commodity handling system in conjunction with or as a part of other automated control processes, such as commodity weighing, shipping and receiving inventory, status monitoring, etc. The present invention has been incorporated by the applicant into a grain elevator management system (GEMS) performing such various functions. The main menu for the GEMS package is shown in FIG. 7 and the functional flow diagrams for the GEMS package are illustrated in FIG. 12. The GEMS computer program listings for the computer 30 (GEMS-INIT and GEMS PART-1) and the controller 38 (MODICON 484) can be found in the microfiche appendix filed with this application. It will be appreciated that communications between the controller 38 and the computer 30 will be performed by a conventional Input/Output (I/O) subroutine loaded into the computer 30. Other I/O communication needs may be handled by suitable other conventional I/O subroutines.

The following is a source program listing of the Gate calculation routine, the general description of which is provided in the logic flow diagram of FIG. 9. This particular program is for use with the commodity handling system illustrated in FIG. 2 wherein a total of four conveying devices and one hopper are utilized along with 11 blending gates. It will be appreciated that alterations or modifications may be made to the program depending on the particular system configuration and support software utilized.

| | GATE CALCULATIONS | |
|---|---|---|
| 24999 | REM | *** BPH TO CTS-GATE CALCS. |
| 25000 | REM | INITIALIZATION: |
| 25001 | REM | ** ZERO CURRENT RESTRICTIONS |
| 25002 | REM | ** RETRIEVE GATES ASSIGNED |
| 25003 | REM | ** RETRIEVE GATES PERCENTAGE |
| 25010 | FOR | JJ = 1 TO 5:CT(JJ,2) = 0: NEXT JJ: FOR JJ = 1 TO 3:WT(JJ,1) = VAL ( IRS(JJ + 16)):WT(JJ,4) = VAL ( IRS(JJ + 19)): NEXT JJ |
| 25015 | REM | ** GATE NUMBERS > 14 INDICATE |
| 25017 | REM | ** SKIP THESE CALCULATIONS |
| 25020 | FOR JJ | = 1 TO 3: IF WT (JJ,1) > 14 THEN 25130 |
| 25130 | NEXT JJ | |
| 25035 | REM | ** FETCH THE RESTRICTION POINT |
| 25036 | REM | ** FOR THIS GATE--IF NO GATE |
| 25037 | REM | ** ASSIGNED-THEN SKIP |
| 25040 | FOR | JJ = 1 TO 3:WT(JJ,3) = BT(WT(JJ,1),3): IF WT(JJ,1) = 0 THEN 25100 |
| 25045 | REM | ** B0=GATE NUMBER |
| 25046 | REM | ** B2=BPH REQUIRED THIS GATE |
| 25047 | REM | ** BP=REQUESTED BPH |
| 25050 | BO = WT(JJ,1):B1 = (WT(JJ,4) / 100) * BT(BO,2) * BP | |
| 25055 | REM | ** B2=NUMBER OF COUNTS TO OPEN |
| 25056 | REM | ** THIS IS THE POLYNOMIAL |
| 25057 | REM | ** CO- IS THE COEFFICIENT TABLE |
| 25060 | B2 = B1 ↑ 3 * CO(BO,3) + B1 ↑ 2 * CO(BO,2)+ B1 * CO(BO,1) + CO(BO,0) | |
| 25065 | REM | ** CAN THE GATE HANDLE THIS FLOW ? |
| 25070 | B2 = INT (B2 * 100): IF B2 > BT(BO,1) THEN 25200 | |
| 25075 | REM | ** YES-SAVE INTEGER PORTION |
| 25080 | B1 = INT (B1 * 100) | |
| 25085 | REM | ** SAVE COUNTS IN WORK TABLE |
| 25086 | REM | ** ADD THIS FLOW RATE TO THIS |
| 25087 | REM | ** GATES RESTRICTION POINT |
| 25088 | REM | ** IS POINT OVER-LOADED |
| 25090 | WT(JJ,5) = B2:CT(WT(JJ,3),2) = CT(WT (JJ,3),2) + B1: IF CT(WT(JJ,3),2) > CT(WT(JJ,3),1) THEN 25200 | |
| 25100 | NEXT JJ | |
| 25105 | REM | ** ADD RESTRICTIVE POINTS THAT |
| 25106 | REM | ** COMBINE-CHECK FOR OVER-LOAD, |
| 25110 | CT(3,2) = CT(3,2) + CT(1,2) + CT(2,2); IF CT(3,2) > CT(3,1) THEN 25200 | |
| 25120 | CT(5,2) = CT(3,2) + CT(4,2): IF CT(5,2) > CT(5,1) THEN 25200 | |
| 25125 | REM | ** TELL OPERATOR WHAT THRU-PUT |
| 25126 | REM | ** HE CAN GET.. |
| 25130 | VTAB 12: HTAB 2: PRINT "CAL- CULA- TED FLOW: "; CT(5,2); "BPH" | |
| 25135 | REM | ** RETURN TO MAIN PROGRAM |
| 25140 | RETURN | |
| 25145 | REM | ** SUBTRACT 100 BPH FROM REQUESTED BPH |
| 25146 | REM | ** DUE TO MACHINE LIMITS-ALL NUMBERS |
| 25147 | REM | ** ARE DIVIDED BY 100 |
| 25148 | REM | ** THEN GO BACK & TRY IT AGAIN |
| 25200 | BP = BP − 1: GOTO 25000 | |

It is to be understood, that even though the above numerous characteristics and advantages of the present invention have been set forth in the foregoing description, together with details of the structure and function of the invention, the disclosure is illustrative only, and changes may be made in detail, especially in matters of shape, size and arrangement of parts within the principle of the invention, to the full extent indicated by the broad general meaning of the terms in which the appended claims are expressed.

What is claimed is:

1. An apparatus for blending commodities in a commodity handling system, the commodity handling system including container means for holding the various commodities, the commodity handling system further including discharge means for enabling commodities to be discharged from said container means, the commodity handling system additionally including conveyor means for moving said commodities, the blending apparatus comprising:

(a) means for selecting the container means whose commodities are to be blended together;

(b) means for selecting the relative proportion of the commodities to be blended as a percentage of the total commodities to be blended;

(c) determining means for determining the amount the discharge means of said container means selected must be opened so as to derive the selected percentages, said determining means including means for determining the rate of commodity discharge at each of the selected container means and storage means including a set of predetermined values for defining the relationship between the rate of commodity discharge and the discharge means opening at each of the selected container means; and (d) opening means for opening said discharge means of the selected container means the amount required, said opening means including master cylinder means interconnected to a plurality of slave cylinders for selectively actuating said slave cylinders, said slave cylinders being operatively interconnected to said discharge means for opening of said discharge means of the selected container means upon being actuated by said master cylinder means.

2. An apparatus in accordance with claim 1, wherein said opening means includes a shaft encoder means, said shaft encoder means being operatively interconnected to said master cylinder means such that movement of said master cylinder means causes movement of said shaft encoder means.

3. An apparatus in accordance with claim 2, wherein said master cylinder means includes a master hydraulic cylinder interconnected to said slave cylinders by suitable hydraulic conduits, said hydraulic conduits including four-way valve means, said valve means having first and second states, said first state allowing flow of hydraulic fluid in a first direction for opening of said discharge means, said second state enabling flow of hydraulic fluid in a second direction for closing said discharge means.

4. An apparatus in accordance with claim 3, wherein each of said slave cylinders is operatively connected to said four-way valve means, there being one of said four-way valve means for each of said slave cylinders.

5. An apparatus in accordance with claim 4, said opening means further including a hydraulic pump apparatus for pumping hydraulic fluid to said master hydraulic cylinder, said opening means further including a four-way flow control valve means having first and second state, said first state enabling hydraulic fluid to flow from said pump to said slave cylinder, said second state enabling hydraulic fluid to flow from said master hydraulic cylinder to said slave cylinder.

6. An apparatus in accordance with claim 5, wherein said flow control valve means includes a third state for enabling recirculating of hydraulic fluid through said pump apparatus.

7. An apparatus in accordance with claim 4, further including a manual control panel having switch controls for retraction and extension of said master hydraulic cylinder and for activation of said four-way valve means to said first or second states.

8. A commodity handling system for delivering a mixture of commodities to a preselected destination, said system comprising:
- (a) containers for holding the commodities;
- (b) conveying apparatus for conveying commodities from one location to another;
- (c) discharge means attached to said containers for discharging said commodities from said containers;
- (d) means for selecting one or more containers whose commodities therein are to be delivered to a common destination;
- (e) means for selecting the relative proportions of each of said commodities to be delivered to said common destination as a percentage of the total commodities to be blended;
- (f) means operatively connected to said discharge means for opening and closing said discharge means of said selected containers, said means including a master cylinder apparatus; and
- (g) control means for controlling the operation of said master cylinder apparatus, said control means extending or retracting said master cylinder apparatus as required, said control means monitoring the movement of said master cylinder apparatus, said control means including determining means for determining the proper amount that said discharge means must open in order to derive the selected percentages for each of said commodities, said determining means including means for determining the rate of commodity discharge at each of said selected containers and storage means having a set of predetermined values for defining the relationship between the movement of said master cylinder apparatus and the rate of commodity discharge at each of said selected containers.

9. An apparatus for blending commodities in a commodity handling system, the commodity handling system including container means for holding the various commodities, the commodity handling system further including discharge means for enabling commodities to be discharged from said container means, commodity handling system additionally including conveyor means for moving said commodities, the blending apparatus comprising:
- (a) control means including:
  - (i) means for selecting the container means from which commodities are to be discharged;
  - (ii) means for selecting the destination to which said discharged commodities are to be delivered;
  - (iii) means for selecting the relative proportions of each of said commodities as a percentage of the total commodities to be blended;
  - (iv) means for selecting the total combined rate of discharge of said commodities from all of said selected container means;
  - (v) determining means for determining the rate of commodity discharge from each of said selected container means and the corresponding amount of opening required of each of said discharge means for the container means selected to obtain the preselected relative proportions of said commodities at said destination;
- (b) master cylinder means operatively interconnected with said discharge means for selectively operating said discharge means of the container means selected, said master cylinder means being activated and deactivated by said control means as required; and
- (c) monitoring means for monitoring the movement of said master cylinder means, said monitoring means being operatively interconnected with said control means for informing said control means of said master cylinder means movement, said determining means of said control means including storage means including a set of predetermined values, said predetermined values comprising the coefficients of an nth degree polynomial equation defining the relationship between the rate of commodity discharge and the amount of said master cylinder means movement for each of said discharge means.

10. An apparatus in accordance with claim 9, wherein said monitoring means includes a digital shaft encoder apparatus, said digital shaft encoder apparatus providing signal pulses to said control means corresponding to movement of said master cylinder means.

11. An apparatus in accordance with claim 10, wherein said master cylinder means includes a master hydraulic cylinder and wherein said discharge means includes a gate apparatus operatively connected to a hydraulic cylinder, said hydraulic cylinder being operatively connected to said master hydraulic cylinder by hydraulic fluid lines, including valve means operatively interconnected to said control means, said valve means being selectively activated and deactivated by said control means so as to enable said master hydraulic cylinder to selectively actuate said hydraulic cylinders operatively connected to said gate apparatus of said discharge means.

12. An apparatus for blending commodities in a commodity handling system, the commodity handling system including container means for holding the various commodities, commodity handling system further including discharge means for enabling commodities to be discharged from said container means, the commodity handling system additionally including conveyor means for moving said commodities, the blending apparatus comprising:
- (a) master hydraulic actuator means operatively connected to a source of hydraulic fluid, said master hydraulic actuator means including a piston portion and a cylinder portion;
- (b) said discharge means including actuator means operatively connected to said master hydraulic actuator means by hydraulic fluid lines, thus enabling said master hydraulic actuator means movement to regulate movement of said actuator means of said discharge means;
- (c) control means for enabling operator selection of the container means from which said commodities are to be discharged, said control means also enabling operator selection of the total combined rate of discharge of said commodities from all of said selected container means, said control means further enabling operator selection of the commodity rate of discharge from each of the container means as a percentage of the total rate of commodity discharge from all the container means selected, said control means controlling operation of said master hydraulic actuator means and including determining means for determining the rate of commodity discharge from each of said selected container means and the amount of master hydraulic actuator means movement required to open each discharge means of said selected container means such that the selected percentage of commodity discharge from each of the container means is obtained, said determining means including storage means including a predetermined set of coefficients of a 3rd or higher degree polynomial equation for each of said selected container means defining the relationship between the rate of commodity discharge from said selected container means and the amount of said master hydraulic actuator means movement as follows:

$$Y = C3X^3 + C2X^2 + C1X^1 + C0$$

where X represents the rate of commodity discharge from each of said selected container means and Y represents the amount of master hydraulic actuator means movement; and (d) monitoring means for monitoring said master hydraulic actuator means movement, said monitoring means being operatively connected to said control means for informing said control means of said movement.

13. A method of blending commodities in a commodity handling system, the commodity handling system including container means for holding the various commodities, the commodity handling system further including discharge means for enabling commodities to be discharged from said container means, the commodity handling system additionally including conveyor means for moving said commodities, the method of blending comprising:

(a) selecting the container means from which commodities are to be discharged;

(b) selecting the relative discharge rates of each of the commodities as a percentage of the total discharge rate;

(c) selecting the destination to which the commodities are to be conveyed;

(d) selecting the total rate of discharge of said commodities from all of the selected container means combined;

(e) determining the amount of opening required of the discharge means associated with each of the container means selected such that the selected discharge rates are obtained, said determining step utilizing a table of predetermined values in storage means which defines the relationship between the rate of commodity discharge and the amount of discharge means opening at each of the selected container means; and (f) opening the discharge means of the selected containers as required.

14. A method in accordance with claim 13, wherein said opening step includes the activation of a master cylinder means which in turn activates cylinder means operatively connected to the discharge means of the selected container means such that the discharge means is opened the required amount.

15. An apparatus in accordance with claim 12, wherein said monitoring means includes a digital shaft encoder apparatus mechanically interconnected to said piston portion of said master hydraulic actuator means to detect movement of said piston portion, said digital shaft encoder providing digital information representative of the movement of said piston portion to programmable controller means of said control means.

16. An apparatus in accordance with claim 12, wherein the blending apparatus further includes a potentiometer apparatus mechanically interconnected to said piston portion of said master hydraulic actuator means to detect movement of said piston portion, said potentiometer apparatus providing analog information representative of the movement of said piston portion to a manual control panel apparatus.

17. An apparatus in accordance with claim 12 wherein said control means includes a programmed general purpose computer and programmable controller means for providing an interface function between said master hydraulic actuator means and said programmed general purpose computer.

18. An apparatus in accordance with claim 12, wherein said control means include means for determining whether the maximum allowable rate of discharge of any of said discharge means of said selected container means is exceeded, said control means further including means for incrementally reducing the total combined rate of discharge of said commodities from all of said selected container means if the maximum allowable rate of discharge is exceeded.

19. An apparatus in accordance with claim 12, further including means for selecting said conveyor means to be utilized for moving said commodities, said control means also including means for determining whether the commodity handling capacity of any of said selected conveyor means is exceeded.

* * * * *